US008065569B2

(12) United States Patent
Kawamura

(10) Patent No.: US 8,065,569 B2
(45) Date of Patent: Nov. 22, 2011

(54) INFORMATION PROCESSING APPARATUS, INFORMATION PROCESSING APPARATUS CONTROL METHOD AND CONTROL PROGRAM

(75) Inventor: Takaaki Kawamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 217 days.

(21) Appl. No.: 12/402,942

(22) Filed: Mar. 12, 2009

(65) Prior Publication Data
US 2009/0235112 A1    Sep. 17, 2009

(30) Foreign Application Priority Data
Mar. 14, 2008    (JP) ................. 2008-066784

(51) Int. Cl.
*G06F 11/00*    (2006.01)
(52) U.S. Cl. ........................ 714/48; 714/6.1
(58) Field of Classification Search .............. 714/5–8, 714/48, 49, 22–24; 713/300
See application file for complete search history.

(56) References Cited

U.S. PATENT DOCUMENTS 5,317,752 A *  5/1994  Jewett et al. ............. 714/14
7,237,140 B2 *  6/2007  Nakamura et al. ........ 714/4
7,865,646 B1 *  1/2011  Falik et al. ............... 710/200

OTHER PUBLICATIONS

"System Control Facility", <URL:http://primeserver.fujitsu.com/primepower/technology/reliance/monitor/>, Dec. 19, 2007.
"High-End Server System Management Console", <URL: http://primeserver.fujitsu.com/ primepower/products/ lineup/pp2500/point.html>, Dec. 19, 2007.
"Sun Enterprise 10000 SSP 3.5 User Guide", <URL: http://dic.sun,com/pdf/816-3624-10/816-3624-10.pdf>, Dec. 19, 2007.

* cited by examiner

*Primary Examiner* — Dieu-Minh Le
(74) *Attorney, Agent, or Firm* — Staas & Halsey LLP

(57) ABSTRACT

An information processing apparatus includes a plurality of hardware resources and operates on a first power supply. The apparatus includes a non-volatile first storage unit that holds first fault information on a fault developed in one or more of the hardware resources even when the first power supply is shut down, a volatile second storage unit that holds second fault information different from the first fault information and is adapted not to hold the second fault information when the first power supply is shut down, a hardware monitoring unit that acquires component information of the plurality of the hardware resources mounted in the information processing apparatus and a system control unit that makes a fault information management unit restore the second fault information held in the second storage unit based on the component information and the first fault information stored in the first storage unit.

14 Claims, 25 Drawing Sheets

| BIT | CAUSE | VALUE | DESCRIPTION |
|---|---|---|---|
| 31 | CORE#0 ERROR | 0 OR 1 | FAULT OF ARITHMETIC CIRCUIT BUILT IN CORE0 |
| 30 | CORE#1 ERROR | 0 OR 1 | FAULT OF ARITHMETIC CIRCUIT BUILT IN CORE1 |
| 29 | CORE#0 TLB BUFFER ERROR | 0 OR 1 | FAULT OF TLB IN CORE0 |
| 28 | CORE#1 TLB BUFFER ERROR | 0 OR 1 | FAULT OF TLB IN CORE1 |
| 27 | CORE#0 TSB BUFFER ERROR | 0 OR 1 | FAULT OF TSB IN CORE0 |
| 26 | CORE#1 TSB BUFFER ERROR | 0 OR 1 | FAULT OF TSB IN CORE1 |
| 25 | CORE#0 L1$ I/F ERROR | 0 OR 1 | FAULT OF L1 CACHE CONTROL CIRCUIT IN CORE0 |
| 24 | CORE#1 L1$ I/F ERROR | 0 OR 1 | FAULT OF L1 CACHE CONTROL CIRCUIT IN CORE1 |
| 23 | CORE#0 L2$ I/F ERROR | 0 OR 1 | FAULT OF L2 CACHE CONTROL CIRCUIT IN CORE0 |
| 22 | CORE#1 L2$ I/F ERROR | 0 OR 1 | FAULT OF L2 CACHE CONTROL CIRCUIT IN CORE1 |
| 21 | CORE#0 L1$ WAY#0 ERROR | 0 OR 1 | WAY FAULT OF L1 CACHE IN CORE0 |
| 20 | CORE#1 L1$ WAY#1 ERROR | 0 OR 1 | WAY FAULT OF L1 CACHE IN CORE1 |
| 19 | CORE#0 L2$ WAY#0 ERROR | 0 OR 1 | WAY FAULT OF L2 CACHE IN CORE0 |
| 18 | CORE#1 L2$ WAY#1 ERROR | 0 OR 1 | WAY FAULT OF L2 CACHE IN CORE1 |
| 17 | CORE#0 L3$ WAY#0 ERROR | 0 OR 1 | WAY FAULT OF CORE0 AND L3 CACHE (SHARED BY CORES) |
| 16 | CORE#1 L3$ WAY#1 ERROR | 0 OR 1 | WAY FAULT OF CORE1 AND L3 CACHE (SHARED BY CORES) |
| 15 | CORE#0 TO I/O CONTROLLER I/F ERROR | 0 OR 1 | PATH FAULT BETWEEN CORE#0 AND I/O CONTROLLER |
| 14 | CORE#1 TO I/O CONTROLLER I/F ERROR | 0 OR 1 | PATH FAULT BETWEEN CORE#1 AND I/O CONTROLLER |
| 13 | CORE#0 TO MEMORY CONTROLLER I/F ERROR | 0 OR 1 | PATH FAULT BETWEEN CORE#0 AND MEMORY CONTROLLER |
| 12 | CORE#1 TO MEMORY CONTROLLER I/F ERROR | 0 OR 1 | PATH FAULT BETWEEN CORE#1 AND MEMORY CONTROLLER |
| 11 | CORE#0 TO L3$ I/F ERROR | 0 OR 1 | PATH FAULT BETWEEN CORE#0 AND L3$ |
| 10 | CORE#1 TO L3$ I/F ERROR | 0 OR 1 | PATH FAULT BETWEEN CORE#1 AND L3$ |
| 9 | RESERVED | FIXED TO 0 | RESERVED AREA |
| 8 | RESERVED | FIXED TO 0 | RESERVED AREA |
| 7 | RESERVED | FIXED TO 0 | RESERVED AREA |
| 6 | RESERVED | FIXED TO 0 | RESERVED AREA |
| 5 | RESERVED | FIXED TO 0 | RESERVED AREA |
| 4 | RESERVED | FIXED TO 0 | RESERVED AREA |
| 3 | RESERVED | FIXED TO 0 | RESERVED AREA |
| 2 | RESERVED | FIXED TO 0 | RESERVED AREA |
| 1 | RESERVED | FIXED TO 0 | RESERVED AREA |
| 0 | RESERVED | FIXED TO 0 | RESERVED AREA |

| BIT | CAUSE | VALUE | DESCRIPTION |
|---|---|---|---|
| 31 | SC#0 ERROR | 0 OR 1 | CIRCUIT FAULT OF SC#0 |
| 30 | SC#1 ERROR | 0 OR 1 | CIRCUIT FAULT OF SC#1 |
| 29 | MC#0 ERROR | 0 OR 1 | CIRCUIT FAULT OF MC#0 |
| 28 | MC#1 ERROR | 0 OR 1 | CIRCUIT FAULT OF MC#1 |
| 27 | SC#0 TO CPU#0-CORE#0 I/F ERROR | 0 OR 1 | PATH FAULT BETWEEN SC#0 AND CPU#0-CORE#0 |
| 26 | SC#0 TO CPU#0-CORE#1 I/F ERROR | 0 OR 1 | PATH FAULT BETWEEN SC#0 AND CPU#0-CORE#1 |
| 25 | SC#0 TO CPU#1-CORE#0 I/F ERROR | 0 OR 1 | PATH FAULT BETWEEN SC#0 AND CPU#1-CORE#0 |
| 24 | SC#0 TO CPU#1-CORE#1 I/F ERROR | 0 OR 1 | PATH FAULT BETWEEN SC#0 AND CPU#1-CORE#1 |
| 23 | SC#1 TO CPU#2-CORE#0 I/F ERROR | 0 OR 1 | PATH FAULT BETWEEN SC#1 AND CPU#2-CORE#0 |
| 22 | SC#1 TO CPU#2-CORE#1 I/F ERROR | 0 OR 1 | PATH FAULT BETWEEN SC#1 AND CPU#2-CORE#1 |
| 21 | SC#1 TO CPU#3-CORE#0 I/F ERROR | 0 OR 1 | PATH FAULT BETWEEN SC#1 AND CPU#3-CORE#0 |
| 20 | SC#1 TO CPU#3-CORE#1 I/F ERROR | 0 OR 1 | PATH FAULT BETWEEN SC#1 AND CPU#3-CORE#1 |
| 19 | SC#0 TO MC#0 I/F ERROR | 0 OR 1 | PATH FAULT BETWEEN SC#0 AND MEMORY CONTROLLER#0 |
| 18 | SC#1 TO MC#1 I/F ERROR | 0 OR 1 | PATH FAULT BETWEEN SC#1 AND MEMORY CONTROLLER#1 |
| 17 | SC#0 TO IOBC#0 I/F ERROR | 0 OR 1 | PATH FAULT BETWEEN SC#0 AND I/O CONTROLLER |
| 16 | SC#1 TO IOBC#1 I/F ERROR | 0 OR 1 | PATH FAULT BETWEEN SC#1 AND I/O CONTROLLER |
| 15 | DIMM#0 ERROR | 0 OR 1 | FAULT OF DIMM OR SPD |
| 14 | DIMM#1 ERROR | 0 OR 1 | |
| 13 | DIMM#2 ERROR | 0 OR 1 | |
| 12 | DIMM#3 ERROR | 0 OR 1 | |
| 11 | DIMM#4 ERROR | 0 OR 1 | |
| 10 | DIMM#5 ERROR | 0 OR 1 | |
| 9 | DIMM#6 ERROR | 0 OR 1 | |
| 8 | DIMM#7 ERROR | 0 OR 1 | |
| 7 | RESERVED | FIXED TO 0 | RESERVED AREA |
| 6 | RESERVED | FIXED TO 0 | RESERVED AREA |
| 5 | RESERVED | FIXED TO 0 | RESERVED AREA |
| 4 | RESERVED | FIXED TO 0 | RESERVED AREA |
| 3 | RESERVED | FIXED TO 0 | RESERVED AREA |
| 2 | RESERVED | FIXED TO 0 | RESERVED AREA |
| 1 | RESERVED | FIXED TO 0 | RESERVED AREA |
| 0 | RTC ERROR | FIXED TO 0 | ERROR OF RTC CHIP MOUNTED ON SYSTEM BOARD |

| BIT | CAUSE | VALUE | DESCRIPTION |
|---|---|---|---|
| 31 | IOBC#0 ERROR | 0 OR 1 | CIRCUIT FAULT OF IOBC#0 |
| 30 | IOBC#1 ERROR | 0 OR 1 | CIRCUIT FAULT OF IOBC#1 |
| 29 | PCI#0 ERROR | 0 OR 1 | FAULT OF PCI SLOT |
| 28 | PCI#1 ERROR | 0 OR 1 | FAULT OF PCI SLOT |
| 27 | PCI#2 ERROR | 0 OR 1 | FAULT OF PCI SLOT |
| 26 | PCI#3 ERROR | 0 OR 1 | FAULT OF PCI SLOT |
| 25 | IOBC#0 TO SC#0 I/F ERROR | 0 OR 1 | PATH FAULT BETWEEN IOBC#0 AND SC#0 |
| 24 | IOBC#1 TO SC#1 I/F ERROR | 0 OR 1 | PATH FAULT BETWEEN IOBC#1 AND SC#1 |
| 23 | IOBC#0 TO PCI#0 I/F ERROR | 0 OR 1 | PATH FAULT BETWEEN IOBC#0 AND PCI#0 |
| 22 | IOBC#0 TO PCI#1 I/F ERROR | 0 OR 1 | PATH FAULT BETWEEN IOBC#0 AND PCI#1 |
| 21 | IOBC#0 TO SCI#2 I/F ERROR | 0 OR 1 | PATH FAULT BETWEEN IOBC#0 AND PCI#2 |
| 20 | IOBC#0 TO SCI#3 I/F ERROR | 0 OR 1 | PATH FAULT BETWEEN IOBC#0 AND PCI#3 |
| 19 | RESERVED | FIXED TO 0 | RESERVED AREA |
| 18 | RESERVED | FIXED TO 0 | RESERVED AREA |
| 17 | RESERVED | FIXED TO 0 | RESERVED AREA |
| 16 | RESERVED | FIXED TO 0 | RESERVED AREA |
| 15 | RESERVED | FIXED TO 0 | RESERVED AREA |
| 14 | RESERVED | FIXED TO 0 | RESERVED AREA |
| 13 | RESERVED | FIXED TO 0 | RESERVED AREA |
| 12 | RESERVED | FIXED TO 0 | RESERVED AREA |
| 11 | RESERVED | FIXED TO 0 | RESERVED AREA |
| 10 | RESERVED | FIXED TO 0 | RESERVED AREA |
| 9 | RESERVED | FIXED TO 0 | RESERVED AREA |
| 8 | RESERVED | FIXED TO 0 | RESERVED AREA |
| 7 | RESERVED | FIXED TO 0 | RESERVED AREA |
| 6 | RESERVED | FIXED TO 0 | RESERVED AREA |
| 5 | RESERVED | FIXED TO 0 | RESERVED AREA |
| 4 | RESERVED | FIXED TO 0 | RESERVED AREA |
| 3 | RESERVED | FIXED TO 0 | RESERVED AREA |
| 2 | RESERVED | FIXED TO 0 | RESERVED AREA |
| 1 | RESERVED | FIXED TO 0 | RESERVED AREA |
| 0 | RESERVED | FIXED TO 0 | RESERVED AREA |

| BIT | STATE | VALUE | DESCRIPTION |
|---|---|---|---|
| 7 | ALARM | 0 OR 1 | OBJECT CPU MODULE IS "ALARM": 1<br>OTHER CASES: 0 |
| 6 | WARNING | 0 OR 1 | OBJECT CPU MODULE IS "ALARM": 1<br>OTHER CASES: 0 |
| 5 | RESERVED | FIXED TO 0 | RESERVED AREA |
| 4 | RESERVED | FIXED TO 0 | RESERVED AREA |
| 3 | RESERVED | FIXED TO 0 | RESERVED AREA |
| 2 | RESERVED | FIXED TO 0 | RESERVED AREA |
| 1 | RESERVED | FIXED TO 0 | RESERVED AREA |
| 0 | RESERVED | FIXED TO 0 | RESERVED AREA |

FIG. 7

| BIT | CAUSE | VALUE |
|---|---|---|
| 31 | CORE#0 ERROR | 0 |
| 30 | CORE#1 ERROR | 0 |
| 29 | CORE#0 TLB BUFFER ERROR | 0 |
| 28 | CORE#1 TLB BUFFER ERROR | 0 |
| 27 | CORE#0 TSB BUFFER ERROR | 0 |
| 26 | CORE#1 TSB BUFFER ERROR | 0 |
| 25 | CORE#0 L1$ I/F ERROR | 0 |
| 24 | CORE#1 L1$ I/F ERROR | 0 |
| 23 | CORE#0 L2$ I/F ERROR | 0 |
| 22 | CORE#1 L2$ I/F ERROR | 0 |
| 21 | CORE#0 L1$ WAY#0 ERROR | 0 |
| 20 | CORE#1 L1$ WAY#1 ERROR | 0 |
| 19 | CORE#0 L2$ WAY#0 ERROR | 1 |
| 18 | CORE#1 L2$ WAY#1 ERROR | 0 |
| 17 | CORE#0 L3$ WAY#0 ERROR | 0 |
| 16 | CORE#1 L3$ WAY#1 ERROR | 0 |
| 15 | CORE#0 TO I/O CONTROLLER I/F ERROR | 0 |
| 14 | CORE#1 TO I/O CONTROLLER I/F ERROR | 0 |
| 13 | CORE#0 TO MEMORY CONTROLLER I/F ERROR | 0 |
| 12 | CORE#1 TO MEMORY CONTROLLER I/F ERROR | 0 |
| 11 | CORE#0 TO L3$ I/F ERROR | 0 |
| 10 | CORE#1 TO L3$ I/F ERROR | 0 |
| 9 | RESERVED | 0 |
| 8 | RESERVED | 0 |
| 7 | RESERVED | 0 |
| 6 | RESERVED | 0 |
| 5 | RESERVED | 0 |
| 4 | RESERVED | 0 |
| 3 | RESERVED | 0 |
| 2 | RESERVED | 0 |
| 1 | RESERVED | 0 |
| 0 | RESERVED | 0 |

FIG. 8

| BIT | CAUSE | VALUE |
|---|---|---|
| 31 | CORE#0 ERROR | 0 |
| 30 | CORE#1 ERROR | 0 |
| 29 | CORE#0 TLB BUFFER ERROR | 0 |
| 28 | CORE#1 TLB BUFFER ERROR | 0 |
| 27 | CORE#0 TSB BUFFER ERROR | 0 |
| 26 | CORE#1 TSB BUFFER ERROR | 0 |
| 25 | CORE#0 L1$ I/F ERROR | 0 |
| 24 | CORE#1 L1$ I/F ERROR | 0 |
| 23 | CORE#0 L2$ I/F ERROR | 0 |
| 22 | CORE #1 L2$ I/F ERROR | 0 |
| 21 | CORE#0 L1$ WAY#0 ERROR | 0 |
| 20 | CORE#1 L1$ WAY#1 ERROR | 0 |
| 19 | CORE#0 L2$ WAY#0 ERROR | 1 |
| 18 | CORE#1 L2$ WAY#1 ERROR | 1 |
| 17 | CORE#0 L3$ WAY#0 ERROR | 0 |
| 16 | CORE#1 L3$ WAY#0 ERROR | 0 |
| 15 | CORE#0 TO I/O CONTROLLER I/F ERROR | 0 |
| 14 | CORE#1 TO I/O CONTROLLER I/F ERROR | 0 |
| 13 | CORE#0 TO MEMORY CONTROLLER I/F ERROR | 0 |
| 12 | CORE#1 TO MEMORY CONTROLLER I/F ERROR | 0 |
| 11 | CORE#0 TO L3$ I/F ERROR | 0 |
| 10 | CORE#1 TO L3$ I/F ERROR | 0 |
| 9 | RESERVED | 0 |
| 8 | RESERVED | 0 |
| 7 | RESERVED | 0 |
| 6 | RESERVED | 0 |
| 5 | RESERVED | 0 |
| 4 | RESERVED | 0 |
| 3 | RESERVED | 0 |
| 2 | RESERVED | 0 |
| 1 | RESERVED | 0 |
| 0 | RESERVED | 0 |

FIG. 9

| BIT | STATE | VALUE |
|---|---|---|
| 7 | ALARM | 0 |
| 6 | WARNING | 1 |
| 5 | RESERVED | 0 |
| 4 | RESERVED | 0 |
| 3 | RESERVED | 0 |
| 2 | RESERVED | 0 |
| 1 | RESERVED | 0 |
| 0 | RESERVED | 0 |

FIG. 10

| ITEM NUMBER | MOTIVE OF SERVICE PROCESSOR ACTIVATION | STATE OF DB1 | STATE OF DB2 | MATCHING TEST RESULT | MISMATCH DETECTION EVENT |
|---|---|---|---|---|---|
| 1 | ACTIVATE BY SWITCHING ON SERVER POWER | NO CAUSE | NORMAL | NORMAL | NONE |
| 2 | REBOOT | | NORMAL | | NONE |
| 3 | REBOOT | | WARNING | WARNING (EMPLOY STATE HIGHER IN SERIOUSNESS) | NONE |
| 4 | REBOOT | | ALARM | ALARM (EMPLOY STATE HIGHER IN SERIOUSNESS) | NONE |
| 5 | ACTIVATE BY SWITCHING ON SERVER POWER | CAUSE OF WARNING | NORMAL | WARNING (EMPLOY STATE HIGHER IN SERIOUSNESS) | NONE |
| 6 | REBOOT | | NORMAL | WARNING (EMPLOY STATE HIGHER IN SERIOUSNESS) | EXISTS |
| 7 | REBOOT | | WARNING | WARNING | NONE |
| 8 | REBOOT | | ALARM | ALARM (EMPLOY STATE HIGHER IN SERIOUSNESS) | NONE |
| 9 | ACTIVATE BY SWITCHING ON SERVER POWER | CAUSE OF ALARM | NORMAL | ALARM | NONE |
| 10 | REBOOT | | NORMAL | ALARM | EXISTS |
| 11 | REBOOT | | WARNING | ALARM (EMPLOY STATE HIGHER IN SERIOUSNESS) | EXISTS |
| 12 | REBOOT | | ALARM | ALARM | NONE |

FIG. 11

| DEC | BYTES 0 TO 3 | BYTES 4 TO 7 | BYTES 8 TO 11 | BYTES 12 TO 15 |
|---|---|---|---|---|
| 0 | OCCURRENCE TIME (8 BYTES) | | OLD STATE (4 BYTES) | NEW STATE (4 BYTES) |
| 16 | FAULTY COMPONENT NAME (32 BYTES) | | | |
| 32 | FAULTY COMPONENT NAME (CONTINUED) | | | |
| 48 | DETECTION SOURCE (4 BYTES) | RESERVED (12 BYTES) | | |
| 64 | CAUSE-OF-FAULT CHARACTER STRING (64 BYTES) | | | |
| 80 | | | | |
| 96 | CAUSE-OF-FAULT CHARACTER STRING (CONTINUED) | | | |
| 112 | | | | |
| 128 | CAUSE-OF-FAULT CHARACTER STRING (CONTINUED) | | | |

FIG. 12

| FIELD NAME | SIZE (BYTE) | CONTENTS |
|---|---|---|
| TIME OF OCCURRENCE | 8 | TIME (GMT) WHEN ANALYSIS PROGRAM OR MONITORING SOFTWARE HAS DETECTED FAULT EXPRESSED IN BCD FORM. EXAMPLE: DECEMBER 31, 2007, 23:29:30 IS EXPRESSED AS "20071231235930" |
| OLD STATE | 4 | STATE OF DB2 BEFORE REBOOTING SCF<br>ALARM: 0x02<br>WARNING: 0x01 |
| NEW STATE | 4 | STATE OF DB2 AFTER MISMATCH DETECTION<br>ALARM: 0x02<br>WARNING: 0x01 |
| DETECTION SOURCE | 4 | COMPONENT IDENTIFIER THAT HAS DETECTED MISMATCH ERROR MANAGEMENT SOFTWARE: 0x03 |
| FAULTY COMPONENT NAME | 32 | CHARACTER STRING INDICATING FAULT POSITION (CHARACTER STRING LIST DESCRIBED LATER) |
| CAUSE-OF-FAULT CHARACTER STRING | 64 | FIXED CHARACTER STRING INDICATING MISMATCH DETECTION CHARACTER STRING: "COMPONENT STATUS MISMATCHED." |

| HARDWARE RESOURCE | FAULTY COMPONENT NAME | DB AREA ACCESSED |
|---|---|---|
| SYSTEM BOARD | /SB#X | SYSTEM BOARD AREA OF DB1 |
| I/O BOARD | /IOB#X | I/O BOARD AREA OF DB1 |
| CPU MODULE | /SB#X/CPU#Y | CPU MODULE AREA OF DB1 |

FIG. 13

| DEC | BYTES 0 TO 3 | BYTES 4 TO 7 | BYTES 8 TO 11 | BYTES 12 TO 15 |
|---|---|---|---|---|
| 0 | OCCURRENCE TIME (8 BYTES) | | OLD STATE (4 BYTES) | NEW STATE (4 BYTES) |
| 16 | FAULTY COMPONENT NAME (32 BYTES) | | | |
| 32 | FAULTY COMPONENT NAME (CONTINUED) | | | |
| 48 | DETECTION SOURCE (4 BYTES) | RESERVED (12 BYTES) | | |
| 64 | CAUSE-OF-FAULT CHARACTER STRING (64 BYTES) | | | |
| 80 | CAUSE-OF-FAULT CHARACTER STRING (CONTINUED) | | | |
| 96 | CAUSE-OF-FAULT CHARACTER STRING (CONTINUED) | | | |
| 112 | CAUSE-OF-FAULT CHARACTER STRING (CONTINUED) | | | |
| 128 | CAUSE-OF-FAULT CHARACTER STRING (CONTINUED) | | | |

FIG. 14

| FIELD NAME | SIZE (BYTE) | CONTENTS |
|---|---|---|
| TIME OF OCCURRENCE | 8 | TIME (GMT) WHEN ANALYSIS PROGRAM OR MONITORING SOFTWARE HAS DETECTED FAULT EXPRESSED IN BCD FORM. EXAMPLE: DECEMBER 31, 2007, 23:29:30 IS EXPRESSED AS "20071231235930" |
| OLD STATE | 4 | STATE OF DB2 BEFORE REBOOTING SCF<br>ALARM: 0x02<br>WARNING: 0x01 |
| NEW STATE | 4 | STATE OF DB2 AFTER MISMATCH DETECTION<br>ALARM: 0x02<br>WARNING: 0x01 |
| DETECTION SOURCE | 4 | COMPONENT IDENTIFIER THAT HAS DETECTED MISMATCH ERROR MANAGEMENT SOFTWARE: 0x03 |
| FAULTY COMPONENT NAME | 32 | CHARACTER STRING INDICATING FAULT POSITION (CHARACTER STRING LIST DESCRIBED LATER) |
| CAUSE-OF-FAULT CHARACTER STRING | 64 | FIXED CHARACTER STRING INDICATING MISMATCH DETECTION CHARACTER STRING: "COMPONENT STATUS MISMATCHED." |

| HARDWARE RESOURCE | FAULTY COMPONENT NAME | DB AREA ACCESSED |
|---|---|---|
| SYSTEM BOARD | /SB#X | SYSTEM BOARD AREA OF DB1 |
| I/O BOARD | /IOB#X | I/O BOARD AREA OF DB1 |
| CPU MODULE | /SB#X/CPU#Y | CPU MODULE AREA OF DB1 |

FIG. 15

2007/Dec/31 23:59:30:CPU#0:Component status mismatched (Warning→Alarm)

*FIG. 16*

<OCCURRENCE TIME> <colon> <HARDWARE RESOURCE> <colon> <CAUSE-OF-FAULT CHARACTER STRING>→(<OLD STATE>)

FIG. 20

| DEC | BYTES 0 TO 3 | BYTES 4 TO 7 | BYTES 8 TO 11 | BYTES 12 TO 15 |
|---|---|---|---|---|
| 0 | OCCURRENCE TIME (8 BYTES) | | RESERVED (8 BYTES) | |
| 16 | FAULTY COMPONENT NAME (32 BYTES) | | | |
| 32 | FAULTY COMPONENT NAME (CONTINUED) | | | |
| 48 | DETECTION SOURCE (4 BYTES) | RESERVED (12 BYTES) | | |
| 64 | CAUSE-OF-FAULT CHARACTER STRING (64 BYTES) | | | |
| 80 | CAUSE-OF-FAULT CHARACTER STRING (CONTINUED) | | | |
| 96 | CAUSE-OF-FAULT CHARACTER STRING (CONTINUED) | | | |
| 112 | CAUSE-OF-FAULT CHARACTER STRING (CONTINUED) | | | |
| 128 | CAUSE-OF-FAULT CHARACTER STRING (CONTINUED) | | | |

FIG. 21

| FIELD NAME | SIZE (BYTE) | CONTENTS |
|---|---|---|
| TIME OF OCCURRENCE | 8 | TIME (GMT) WHEN ANALYSIS PROGRAM OR MONITORING SOFTWARE HAS DETECTED FAULT |
| DETECTION SOURCE | 4 | COMPONENT IDENTIFIER THAT HAS DETECTED FAULT ANALYSIS PROGRAM: 0x01 MONITORING PROGRAM: 0x02 |
| FAULTY COMPONENT NAME | 32 | CHARACTER STRING INDICATING FAULT POSITION (CHARACTER STRING LIST DESCRIBED LATER) |
| CAUSE-OF-FAULT CHARACTER STRING | 64 | CAUSE-INDICATING CHARACTER STRING UNDERSTANDABLE BY SYSTEM MANAGER OR REPORTING SOFTWARE EXAMPLE: "L2 CACHE CORRECTABLE ERROR" |

| HARDWARE RESOURCE | FAULTY COMPONENT NAME | DB AREA ACCESSED |
|---|---|---|
| SYSTEM BOARD | /SB#X | SYSTEM BOARD AREA OF DB1 |
| I/O BOARD | /IOB#X | I/O BOARD AREA OF DB1 |
| CPU MODULE | /SB#X/CPU#Y | CPU MODULE AREA OF DB1 |

FIG. 22

| DEC | BYTES 0 TO 3 | BYTES 4 TO 7 | BYTES 8 TO 11 | BYTES 12 TO 15 |
|---|---|---|---|---|
| 0 | OCCURRENCE TIME (8 BYTES) | | RESERVED (8 BYTES) | |
| 16 | FAULTY COMPONENT NAME (32 BYTES) | | | |
| 32 | FAULTY COMPONENT NAME (CONTINUED) | | | |
| 48 | DETECTION SOURCE (4 BYTES) | RESERVED (12 BYTES) | | |
| 64 | CAUSE-OF-FAULT CHARACTER STRING (64 BYTES) | | | |
| 80 | CAUSE-OF-FAULT CHARACTER STRING (CONTINUED) | | | |
| 96 | CAUSE-OF-FAULT CHARACTER STRING (CONTINUED) | | | |
| 112 | CAUSE-OF-FAULT CHARACTER STRING (CONTINUED) | | | |
| 128 | CAUSE-OF-FAULT CHARACTER STRING (CONTINUED) | | | |

FIG. 23

| FIELD NAME | SIZE (BYTE) | CONTENTS |
|---|---|---|
| TIME OF OCCURRENCE | 8 | TIME (GMT) WHEN ANALYSIS PROGRAM OR MONITORING SOFTWARE HAS DETECTED FAULT |
| DETECTION SOURCE | 4 | COMPONENT IDENTIFIER THAT HAS DETECTED FAULT ANALYSIS PROGRAM: 0x01 MONITORING PROGRAM: 0x02 |
| FAULTY COMPONENT NAME | 32 | CHARACTER STRING INDICATING FAULT POSITION (CHARACTER STRING LIST DESCRIBED LATER) |
| CAUSE-OF-FAULT CHARACTER STRING | 64 | CAUSE-INDICATING CHARACTER STRING UNDERSTANDABLE BY SYSTEM MANAGER OR REPORTING SOFTWARE EXAMPLE: "L2 CACHE CORRECTABLE ERROR" |

| HARDWARE RESOURCE | FAULTY COMPONENT NAME | DB AREA ACCESSED |
|---|---|---|
| SYSTEM BOARD | /SB#X | SYSTEM BOARD AREA OF DB1 |
| I/O BOARD | /IOB#X | I/O BOARD AREA OF DB1 |
| CPU MODULE | /SB#X/CPU#Y | CPU MODULE AREA OF DB1 |

FIG. 24

| DEC | BYTES 0 TO 3 | BYTES 4 TO 7 | BYTES 8 TO 11 | BYTES 12 TO 15 |
|---|---|---|---|---|
| 0 | OCCURRENCE TIME (8 BYTES) | | RESERVED (8 BYTES) | |
| 16 | FAULTY COMPONENT NAME (32 BYTES) | | | |
| 32 | FAULTY COMPONENT NAME (CONTINUED) | | | |
| 48 | DETECTION SOURCE (4 BYTES) | RESERVED (12 BYTES) | | |
| 64 | CAUSE-OF-FAULT CHARACTER STRING (64 BYTES) | | | |
| 80 | | | | |
| 96 | CAUSE-OF-FAULT CHARACTER STRING (CONTINUED) | | | |
| 112 | | | | |
| 128 | CAUSE-OF-FAULT CHARACTER STRING (CONTINUED) | | | |

FIG. 25

| FIELD NAME | SIZE (BYTE) | CONTENTS |
|---|---|---|
| TIME OF OCCURRENCE | 8 | TIME (GMT) WHEN ANALYSIS PROGRAM OR MONITORING SOFTWARE HAS DETECTED FAULT |
| DETECTION SOURCE | 4 | COMPONENT IDENTIFIER THAT HAS DETECTED FAULT ANALYSIS PROGRAM: 0x01 MONITORING PROGRAM: 0x02 |
| FAULTY COMPONENT NAME | 32 | CHARACTER STRING INDICATING FAULT POSITION (CHARACTER STRING LIST DESCRIBED LATER) |
| CAUSE-OF-FAULT CHARACTER STRING | 64 | CAUSE-INDICATING CHARACTER STRING UNDERSTANDABLE BY SYSTEM MANAGER OR REPORTING SOFTWARE EXAMPLE: "L2 CACHE CORRECTABLE ERROR" |

| HARDWARE RESOURCE | FAULTY COMPONENT NAME | DB AREA ACCESSED |
|---|---|---|
| SYSTEM BOARD | /SB#X | SYSTEM BOARD AREA OF DB1 |
| I/O BOARD | /IOB#X | I/O BOARD AREA OF DB1 |
| CPU MODULE | /SB#X/CPU#Y | CPU MODULE AREA OF DB1 |

INFORMATION PROCESSING APPARATUS, INFORMATION PROCESSING APPARATUS CONTROL METHOD AND CONTROL PROGRAM

CROSS-REFERENCE TO RELATED APPLICATIONS

This application is based upon and claims priority to prior Japanese Patent Application No. 2008-66784 filed on Mar. 14, 2008 in the Japan Patent Office, the entire contents of which are incorporated herein by reference.

FIELD

Various embodiments of the invention discussed herein relate to an information processing apparatus having plural hardware resources, an information processing apparatus control method and a control program.

BACKGROUND

The conventional information processing apparatus including plural hardware resources, a service processor having a CPU (Central Processing Unit) and a memory with a limited area to manage the hardware resources, and a firmware operated on the service processor, is widely used. This information processing apparatus monitors the hardware resources thereon and in the case where a fault develops in any of the hardware resources, notifies the fault information to the management server. The information processing apparatus may lack the function of the service processor displaying the fault state of the information processing apparatus, the management tool function such as the partitioning of the hardware resources and the hot swap menu of the parts, and the storage area storing the logging data. In such an information processing apparatus, the server manager of the connected management server unit manages the fault state and the area using a GUI (Graphical User Interface) or a command line.

In the information processing apparatus described above, the process of notifying the fault information of the hardware resources to the management server is explained with reference to FIG. 19. As depicted in FIG. 19, the information processing apparatus is connected to the management server for managing the information processing apparatus and includes the hardware resources and a service processor for monitoring the fault state of the hardware resources. The information processing apparatus further includes a database DB1 providing a non-volatile hardware storing the causes of the fault developed by the hardware resources and a database DB2 providing a volatile hardware storing the fault state of the hardware resource that has developed the fault. The information processing apparatus further includes an analysis program/hardware monitoring software for executing the process of restoring and notifying fault information, an event distribution software, an error management software and a reporting software. The DB1 constituting the non-volatile hardware used in this configuration is, for example, a NVRAM (Non-Volatile Random Access Memory) or a HDD (Hard Disk Drive) to hold the fault information even in the case where the power of the information processing apparatus is turned off. The DB2 constituting a volatile hardware, on the other hand, is the DRAM (Dynamic Random Access Memory) or SRAM (Static Random Access Memory). The DB2, therefore, unlike the DB1, loses the fault information when the power of the information processing apparatus is turned off and holds the new information when the information processing apparatus is rebooted.

Incidentally, the two DBs including DB1 and DB2 are used to reduce the hardware cost of the service processor by using the non-volatile storage unit low in cost per bit for the DB1 requiring a larger storage area, and the volatile storage unit high in cost per bit for the DB2 requiring a smaller storage area than the DB1.

Specifically, the information processing apparatus is monitored by the service processor (see, (1) of FIG. 19), and all the functions of the service processor can be used. Upon occurrence of a fault in the hardware resources in this state, the analysis program/hardware monitoring software receives the fault information notification by interruption or polling monitoring (see, (2) of FIG. 19). Then, the analysis program/hardware monitoring software stores the physical position of the hardware resource that has developed the fault and the cause of the fault in the DB1 (see, (3) of FIG. 19) and sends a fault notification event transmission request to the event distribution software (see, (4) of FIG. 19).

FIG. 20 is a diagram depicting an example of the information delivered to the event distribution software from the hardware monitoring software according to the prior art. FIG. 21 is a diagram depicting the contents of the information delivered to the event distribution software from the hardware monitoring software according to the prior art. The information delivered by this analysis program/hardware monitoring software to the event distribution software is the binary data fixed at 128 bytes as depicted in FIG. 20, and has a format including the occurrence time, the detection source, the faulty component name and the character string indicating the cause of the fault. Also, the contents and the faulty component name of each format have the contents as depicted in FIG. 21.

The event distribution software that has received the fault notification event transmission request from the analysis program/hardware monitoring software notifies the fault notification event to the error management software (see, (5) of FIG. 19). FIG. 22 is a diagram depicting an example of the information delivered to the error management software from the event distribution software according to the prior art, and FIG. 23 is a diagram depicting the contents of the information delivered to the error management software from the event distribution software according to the prior art. The information delivered by this event distribution software to the error management software, as depicted in FIG. 22, is the binary data fixed at 128 bytes and has a format including the occurrence time, the detection source, the faulty component name and the character string indicating the cause of the fault. Also, the contents and the faulty component name of each format are as depicted in FIG. 23.

Then, the error management software, upon reception of the fault notification event from the event distribution software, accesses the DB1 storing the cause of the fault and detects the fault state of the hardware resource from the cause of the fault corresponding to the fault notification event (see, (6) of FIG. 19). After that, the fault state of the hardware resource derived from the cause of the fault in the DB1 is stored in the DB2 by the error management software (see, (7) of FIG. 19), and the fault information is notified to the reporting software (see, (8) of FIG. 19). FIG. 24 is a diagram depicting an example of the information delivered to the reporting software by the error management software according to the prior art. FIG. 25 is a diagram depicting the contents of the information delivered to the reporting software by the error management software according to the prior art. The information delivered to the reporting software by this error management software, as depicted in FIG. 24, is the binary data fixed at 128 bytes and includes the occurrence time, the detection source, the fault component name and the character string indicating the cause of the fault. Also, the contents of the format and the specific name of the faulty component are depicted in FIG. 25.

The reporting software notifies the fault information to the management server managing the information processing apparatus (see, (9) of FIG. 19). After that, the system manager confirms, in the management server, the fault information notified by the information processing apparatus, and grasps the setting and status of the information processing apparatus to carry out the maintenance operation.

Recently, an information processing apparatus having a service processor requiring no management server has come to be provided by the reduced price of the storage unit and the increased CPU processing speed. In this information processing apparatus, the number of the software and the hardware for operating the software is increased in order to mount the function of the management server, while at the same time requiring the OS (operating system) to have a function such as the multitask.

[Non-Patent Document 1] "System Control Facility", [online], [search on Dec. 19, 2007], Internet<URL: http://primeserver.fujitsu.com/primepower/technology/reliance/monitor/>

[Non-Patent Document 2] "High-End Server System Management Console)", [online], [search on Dec. 19, 2007], Internet<URL: http://primeserver.fujitsu.com/primepower/products/lineup/pp 2500/point.html>

[Non-Patent Document 3] "Sun Enterprise 10000 SSP 3.5 User Guide", [online], [search on Dec. 19, 2007], Internet<URL: http://dlc.sun.com/pdf/816-3624-10/816-3624-10.pdf>

SUMMARY

An information processing apparatus including a plurality of hardware resources and operating on a first power supply, wherein the apparatus includes a non-volatile first storage unit configured to hold first fault information on a fault developed in one or more of the hardware resources even when the first power supply is shut down, a volatile second storage unit configured to hold second fault information different from the first fault information and adapted not to hold the second fault information when the first power supply is shut down, a hardware monitoring unit configured to acquire component information of the hardware resources included in the information processing apparatus, and a system control unit functioning as a fault information management unit and configured to restore the second fault information held in the second storage unit based on the component information and the first fault information stored in the first storage unit.

An information processing apparatus including a plurality of hardware resources and operating on a first power supply, wherein the apparatus includes a first storage unit configured to hold first fault information on a fault developed in one or more of the hardware resources even when the first power supply is shut down, a second storage unit configured to hold second fault information different from the first fault information and adapted not to hold the second fault information when the first power supply is shut down, a fault information management unit configured to decide a matching between the first fault information and the second fault information, and a system control unit configured to make a fault reporting unit notify a fault occurrence when a mismatch is detected between the first fault information and the second fault information.

A control method for an information processing apparatus including a plurality of hardware resources and a system control unit controlling the plurality of the hardware resources, the method including holding first fault information on a fault developed in one or more of the hardware resources in a first storage unit, holding second fault information different from the first fault information in a second storage unit, switching on a first power supply, acquiring component information of the plurality of the hardware resources included in the information processing apparatus, and restoring the second fault information held in the second storage unit based on the component information and the first fault information stored in the first storage unit.

A control method for an information processing apparatus including a plurality of hardware resources and a system control unit controlling the plurality of hardware resources and operating on a first power supply, the method including holding first fault information on fault developed in one or more of the hardware resources in a first storage unit, holding second fault information different from the first fault information in a second storage unit, switching on the first power supply, and notifying an occurrence of a fault when a mismatch is detected between the first fault information and the second fault information.

BRIEF DESCRIPTION OF DRAWINGS

FIG. 3 depicts an example of the data format of the fault information of the CPU module held in the DB1 according to the first embodiment.

FIG. 4 depicts an example of the data format of the fault information of the system board held in the DB1 according to the first embodiment.

FIG. 5 depicts an example of the data format of the fault information of the I/O (Input/Output) board held in the DB1 according to the first embodiment.

FIG. 6 depicts an example of the data format of the fault information of the CPU module held in the DB2 according to the first embodiment.

FIG. 7 is a diagram depicting an example of the DB1 in the case where the CPU module according to the first embodiment develops a fault of WAY #0 of L2 cache.

FIG. 8 is a diagram depicting an example of the DB1 in the case where the CPU module according to the first embodiment develops a fault of WAY #0 of L2 cache and WAY #1 of L2 cache.

FIG. 9 is a diagram depicting an example of the DB2 in the case where the CPU module according to the first embodiment develops a partial fault of L2 cache.

FIG. 10 is a diagram for explaining the specifics of the matching test of DB1 and DB2 according to the first embodiment.

FIG. 11 is a diagram depicting an example of the information delivered to the event distribution software by the error management software according to the first embodiment.

FIG. 12 is a diagram depicting the contents of the information delivered to the event distribution software by the error management software according to the first embodiment.

FIG. 13 is a diagram depicting an example of the information received from the error management software by the reporting software according to the first embodiment.

FIG. 14 is a diagram depicting the contents of the information received from the error management software by the reporting software according to the first embodiment.

FIG. 15 is a diagram depicting an example of the character string of the reporting format generated by the reporting software according to the first embodiment.

FIG. 16 is a diagram depicting the contents of the character string of the reporting format generated by the reporting software according to the first embodiment.

FIG. 20 is a diagram depicting an example of the information delivered to the event distribution software by hardware monitoring software according to the prior art.

FIG. 21 is a diagram depicting the contents of the information delivered to the event distribution software by hardware monitoring software according to the prior art.

FIG. 22 is a diagram depicting an example of the information delivered to the error management software by the event distribution software according to the prior art.

FIG. 23 is a diagram depicting the contents of the information delivered to the error management software by the event distribution software according to the prior art.

FIG. 24 is a diagram depicting an example of the information delivered to the reporting software by the error management software according to the prior art.

FIG. 25 is a diagram depicting the contents of the information delivered to the reporting software by the error management software according to the prior art.

DESCRIPTION OF EMBODIMENTS

The information processing apparatus according to embodiments of the present invention is explained in detail below with reference to the accompanying drawings. The description that follows deals with the outline, features and the configuration of the information processing apparatus and the flow of the process executed by the information processing apparatus disclosed in that order, finally followed by the explanation of the effects of this invention.

First Embodiment

First, the outline and features of the information processing apparatus according to a first embodiment are explained with reference to FIG. 1.

Figure 1:
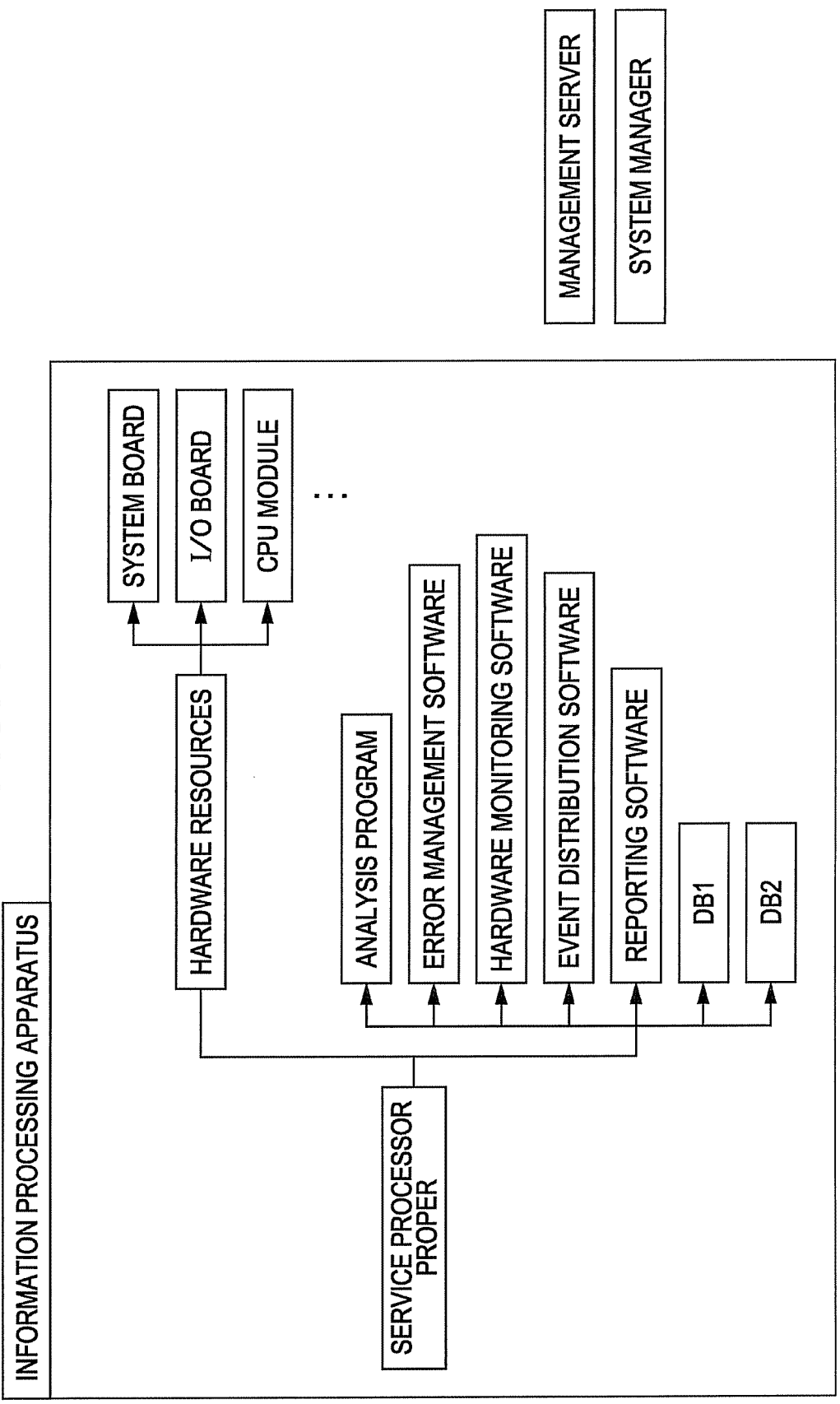
FIG. 1 is a diagram depicting an outline and the features of an information processing apparatus according to a first embodiment.

The information processing apparatus depicted in FIG. 1 is connected with a management server for managing the information processing apparatus and includes a service processor for executing the practical operation and the fault monitoring operation on the information processing apparatus, and hardware resources including the system board, the I/O (Input/Output) board and the CPU module. The service processor includes an analysis program, an error management software, a hardware monitoring software, an event distribution software and a reporting software for executing the process of restoring and notifying the fault information using the information stored in DB1 and DB2.

In this configuration, the information processing apparatus has plural hardware resources and operates on a first power supply. The information processing apparatus according to this embodiment especially includes a non-volatile storage unit and a volatile storage unit and is adapted to restore the fault information held in the volatile storage unit.

These features of the information processing apparatus are explained in detail. The information processing apparatus includes a DB1 as a first storage unit holding the first fault information on the fault developed in the hardware resources even in the case where the first power supply is shut off. The information processing apparatus further includes a DB2 as a second storage unit that holds the second fault information different from the first fault information and which does not hold the second fault information in the case where the first power supply is turned off.

The information processing apparatus is configured of, for example, the DB1 that is a non-volatile hardware storing the cause of the fault of the hardware resource that has developed a fault and which continues to hold the fault information even in the case where the power supply of the information processing apparatus is turned off. The DB2, on the other hand, is a volatile hardware storing the fault state of the hardware resources that have developed a fault, based on the information of the DB1. The DB2, unlike the DB1, loses the fault information in the case where the power of the information processing apparatus is turned off, and once the information processing apparatus is rebooted, maintains the state holding the fault information.

Under this condition, the information processing apparatus acquires the component information of plural hardware resources installed in the information processing apparatus, and based on the acquired component information and the first fault information stored in the first storage unit, restores the second fault information held in the second storage unit.

As a specific example, the information processing apparatus acquires the component information of the plural hardware resources including the system board, the I/O board and the CPU_module installed in the information processing apparatus. When the power thereof is turned on, the information processing apparatus restores the fault information such as the fault state and the physical position of the hardware resources held in the DB2, based on the component information acquired from each hardware resource and the fault information such as the cause of the fault and the physical position of the hardware resources corresponding to the component information held in the DB1.

Thus, the information processing apparatus according to the first embodiment, which has plural hardware resources and operates on the first power supply, acquires the component information of the plural hardware resources included in the information processing apparatus. Moreover, the information processing apparatus can restore the fault information held in the DB2 based on the acquired component information and the fault information stored in the DB1. As a result, the information processing apparatus having the non-volatile and volatile storage units can restore the fault information in the volatile storage unit.

Specifically, the information processing apparatus can restore the fault state with fewer resources without any area to save the fault state even at the time of activating the service processor, and therefore, the fault information in the volatile storage unit can be restored in the information processing apparatus having the both non-volatile and volatile storage units.

Next, the configuration of the information processing apparatus according to the first embodiment is explained with reference to FIG. 2.

Figure 2:
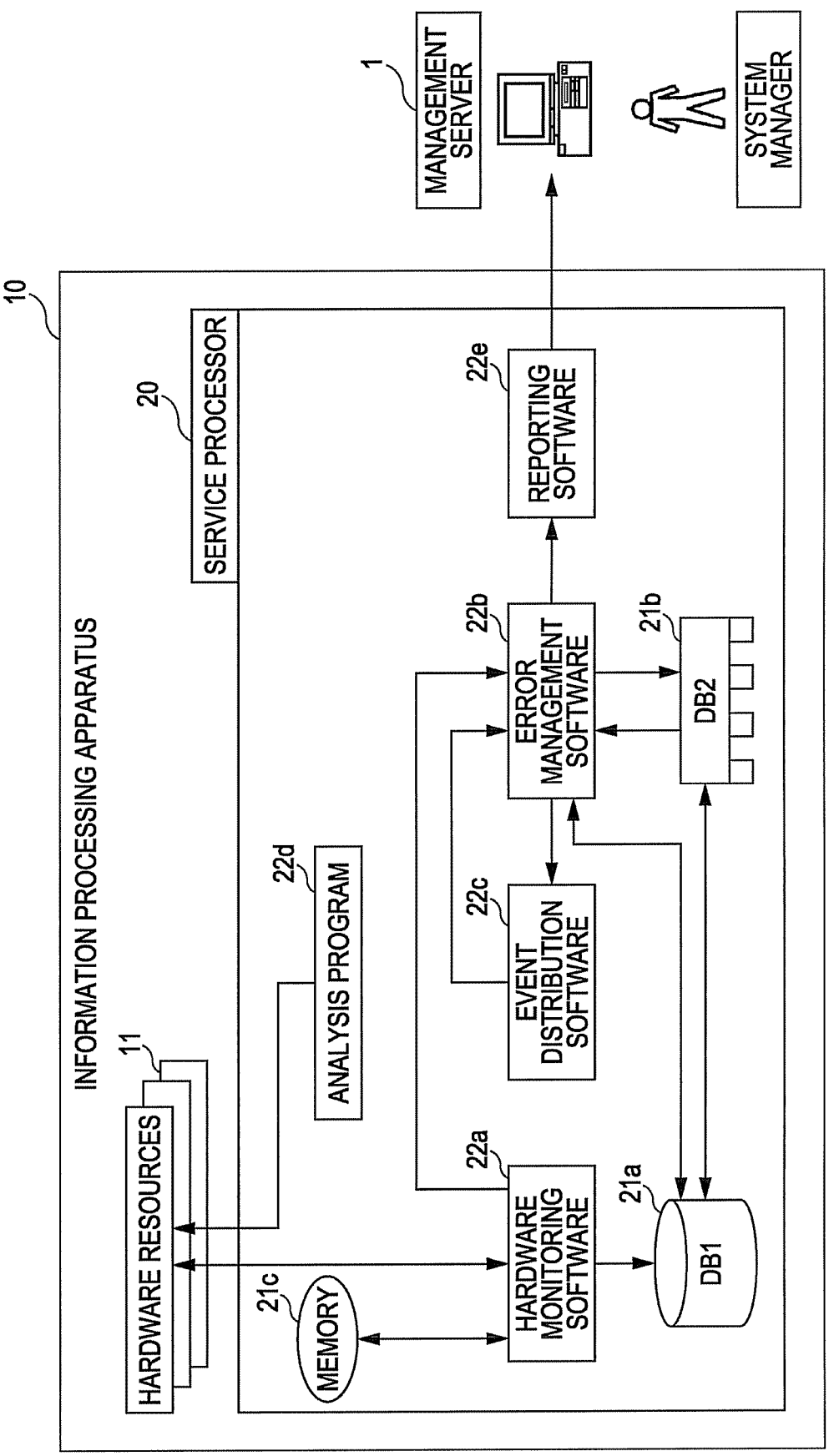
FIG. 2 is a diagram depicting the configuration of the information processing apparatus according to the first embodiment.

As depicted in FIG. 2, the information processing apparatus 10 includes hardware resources 11 and a service processor 20. The information processing apparatus 10 is connected with a management server 1 for managing and maintaining the state of the information processing apparatus 10 and the plural server units. The information processing apparatus 10 is booted in response to the switching on of a resident power supply.

The hardware resources 11 include a system board carrying the parts serving as the main function of the information processing apparatus 10, an I/O board functioning as an input/output port between the information processing apparatus and the devices connected to the information processing apparatus 10, and a CPU module for executing the program and the arithmetic operation.

The service processor 20 includes a DB1, a DB2, a memory 21c, a hardware monitoring software 22a, an error management software 22b, an event distribution software 22c, an analysis program 22d and a reporting software 22e. The service processor 20 performs the practical operation and the fault monitoring operation on the information processing apparatus 10. The service processor 20 is activated when the resident power supply of the information processing apparatus 10 is turned on. In addition, the service processor 20 has a power supply, which is different from the resident power supply of the information processing apparatus 10, and adapted to be automatically rebooted upon occurrence of a fault in the service processor 20.

The DB1 holds the first fault information on the fault developed in the hardware resources even in the case where the first power supply is shut off. The first fault information held in the DB1 includes the identification information for identifying a hardware resource that has developed a fault and the cause of the fault developed in the hardware resource.

FIG. 3 depicts an example of the format of the fault information of the CPU module held in the DB1 according to the first embodiment. The fault information held in the DB1, as depicted in FIG. 3, includes the identification information for identifying the "CPU module" of the hardware resource 11 that has developed a fault and the cause of the fault in the "CPU module" as the hardware resource 11 that has developed the fault.

FIG. 4 depicts an example of the data format of the fault information of the system board held in the DB1 according to the first embodiment. The fault information held in the DB1, as depicted in FIG. 4, includes the identification information for identifying the "system board" as the hardware resources that has developed a fault and the cause of the fault in the "system board" as the hardware resource that has developed a fault. Also, at least one system controller (SC) is mounted, as depicted in FIG. 4, on the system board to connect the CPU, the memory, the I/O and the like. Further, at least one memory controller (MS) is installed on the system board to control the DIMM as depicted in FIG. 4. Further, the I/O board controller (IOBC) functions to connect the PCI bus (peripheral component interconnect bus) and the SC to each other.

FIG. 5 depicts an example of the format of the fault information of the I/O board held in the DB1 according to the first embodiment. The fault information held in the DB1, as depicted in FIG. 5, includes the identification information for identifying the "I/O board" as the hardware resource in the fault and the cause of the fault developed in the "I/O board" as the hardware resource that has developed a fault.

The DB2 is a volatile storage unit that holds the second fault information different from the first fault information, but does not hold the second fault information in the case where the first power supply is shut off. The fault information held in the DB2 includes the identification information for identifying a hardware resource that has developed a fault and the information indicating the degree of the fault developed in the hardware resource.

FIG. 6 depicts an example of the format of the fault information of the CPU module held in the DB2 according to the first embodiment. The fault information held in the DB2, as depicted in FIG. 6, includes the identification information for identifying the "CPU module" as the hardware resource 11 that has developed a fault and the state information indicating the degree of the fault in the "CPU module" as the hardware resource 11 that has developed the fault.

The memory 21c holds the configuration information of the hardware resources 11. The memory 21c holds, for example, the configuration information of the "system board" as the hardware resource 11, on which the parts for serving as the main function of the information processing apparatus 10 are mounted. Also, the memory 21c holds the configuration information of the "I/O board" functioning as the input/output port between the information processing apparatus 10 and the devices connected to the information processing apparatus 10. Further, the memory 21c holds the configuration information of the "CPU module" for executing the program and the arithmetic operation.

The hardware monitoring software 22a acquires the component information of the plural hardware resources 11 installed in the information processing apparatus 10. The hardware monitoring software 22a acquires the configuration information of the plural hardware resources 11 such as the "system board", the "I/O board" and the "CPU module" from the memory 21c in the case where the power supply of the information processing apparatus 10 is turned on or in the case where the service processor 20 is rebooted. Also, the hardware monitoring software 22a analyzes the fault of the hardware such as the power supply or the fan of the information processing apparatus 10, and specifies the position and cause of the fault of the power supply or the fan, and stores the specified information in the DB1. In addition, the hardware monitoring software 22a accesses the library of the error management software 22b and requests the restoration of the fault information held in the DB2 in units of the installed hardware resources 11.

The error management software 22b restores the fault information held in the DB2 based on the acquired component information and the fault information held in the DB1. In addition, the error management software 22b checks the matching between the fault information held in the DB1 and the DB2.

For example, the error management software 22b checks whether the fault state is stored in the DB2 or not by referring to the area in the DB2 corresponding to the fault information of the hardware resource 11 held in the DB1 at the request of the hardware monitoring software 22a to restore the fault information held in the DB2. Then the error management software 22b acquires the prevailing cause of the fault by reference to the DB1.

The error management software 22b checks for the cause of the fault by reference to whether the value "1" is written in the area of the DB1 (see, FIGS. 3 to 5).

FIG. 7 is a diagram depicting an example of the DB1 in the case where the fault WAY #0 of L2 cache (level-2 cache memory) occurs in the CPU module according to the first embodiment. Assume, for example, that a fault WAY #0 of the L2 cache occurs in the CPU module. As depicted in FIG. 7, the value "1" is written in the bit-19 area of the DB1 corresponding to WAY #0 of L2 cache. FIG. 8 is a diagram depicting an example of the DB1 in the case where the fault WAY #0 of L2 cache and the fault WAY #1 of L2 cache occur in the CPU module according to the first embodiment. For example, FIG. 8 depicts that the value "1" is written in the bit-18 area corresponding to the WAY #0 of L2 cache and the bit-19 area corresponding to the WAY #1 of L2 cache of the DB1 when the fault of WAY #1 of L2 cache occur in the CPU module.

Then, the error management software 22b acquires the prevailing fault state with reference to the DB2. In the process, the fault state is acquired by the error management software 22b referring the area of the DB1. FIG. 9 is a diagram depicting an example of the DB2 in the case where the L2 cache has developed a partial fault in the CPU module according to the first embodiment. For example, in the case where the L2 cache has developed the partial fault in the CPU module (see, FIG. 7), the value "1" is written in the bit-6 area of the DB2, as depicted in FIG. 9. Therefore, the error management software 22b acquires the "warning (partial fault)" level indicating the fault state held in the bit-6 area of the DB2.

After that, the error management software 22b conducts the matching test between the DB1 and DB2 as depicted in FIG. 10 using the cause of the fault and the fault state acquired. In the case where the DB1 and DB2 are judged to be unmatched as the result of the matching test, the error management software 22b restores the fault information of the DB2 based on the fault information of the DB1.

Now, the specifics of the matching test between the DB1 and DB2 are explained. FIG. 10 is a diagram for explaining the specifics of the matching test between the DB1 and DB2 according to the first embodiment. The fault state recorded in the volatile DB2 are all initialized to the value "0" in the case where the power of the information processing apparatus 10 is turned on and the service processor 20 is activated. The fault state is classified into "alarm (total fault)" level, "warning (partial fault)" level and "normal (normal)" level in the descending order of seriousness. The description that follows about the specifics of the matching test refers to, as an example, the matching test of the fault information for the hardware CPU #0. Incidentally, the fault state judgment logic may be subjected to hard coding in the error management software 22b.

(Item Number 1)

Item number 1 represents a state in which the service processor 20 is activated with the switching-on of the power of the information processing apparatus 10 as a motive and in which the cause of the fault is not stored in the DB1. Upon activation of the service processor 20 under this condition, the error management software 22b acquires the cause of the fault from the bit area of the DB1. In item number 1, no cause of the fault exists in the DB1, and therefore, the fault state written (restored) in the DB2 is provisionally determined as "normal" level by the error management software 22b. Then, the error management software 22b acquires the fault state of the CPU #0 from the DB2 and compares the fault state level acquired from the DB2 with the fault state level provisionally determined.

In the case where the comparison result depicts that the fault state is not different between the DB1 and DB2, that is to say, that both fault states are "normal", the error management software 22b ends the process without writing (restoring) the provisionally determined fault state "normal" level into the DB2.

(Item Number 2)

Item number 2 represents a state in which the service processor 20 is activated with the rebooting as a motive and the cause of the fault is not stored in the DB1. In the case where the service processor 20 is rebooted under this condition, the error management software 22b acquires the cause of the fault from the bit area of the DB1. In item number 2, the error management software 22b, because of lack of the cause of the fault in the DB1, provisionally determines that the fault state restored in the DB2 is the "normal" level. Then, the error management software 22b acquires the fault state of CPU #0 from the DB2 and compares the fault state acquired from the DB2 with the provisionally determined fault state level.

After that, in the case where the fault state comparison depicts that there is no difference in fault state between the DB1 and DB2, that is to say, that both are "normal", then the error management software 22b finishes the process without writing (restoring) the provisionally determined "normal" state in the DB2.

(Item Number 3)

In item number 3, the service processor 20 is activated with the rebooting as a motive, and no cause of the fault is stored in the DB1. Under this condition, the error management software 22b, upon rebooting of the service processor 20, acquires the cause of the fault from the bit area of the DB1. In the absence of the cause of the fault in the DB1, the error management software 22b provisionally determines that the fault state restored by writing in the DB2 as "normal" level. Then, the error management software 22b acquires the fault state level of the CPU #0 from the DB2 and compares the acquired fault state level with the provisionally determined fault state level. In item number 3, assume that the fault state stored in the DB2 is "warning".

In item number 3, assume that the result of fault state comparison made by the error management software 22b depicts that the fault state is different between the DB1 and DB2. The "normal" level of the fault state provisionally determined from the DB1 or the "warning" level of the fault state acquired from the DB2, whichever is higher in the degree of seriousness, is set as the state of the hardware CPU #0. Thus, the process is finished without writing (restoring) the "normal" level of the provisionally determined fault state in the DB2. In other words, the "warning" level of the fault state stored in the DB2 before rebooting is held as the contents of the DB2 indicating the fault state level stored in the DB1.

(Item Number 4)

Item number 4 represents a state in which the service processor 20 is activated with the rebooting as a motive and the cause of the fault is not stored in the DB1. In the case where the service processor 20 is rebooted under this condition, the error management software 22b acquires the cause of the fault from the bit area of the DB1. In the error management software 22b, because of lack of the cause of the fault in the DB1, the fault state restored by writing into the DB2 is provisionally judged as "normal". Then, the error management software 22b acquires the fault state level of the CPU #0 from the DB2, and compares the fault state level acquired from the DB2 with the fault state level provisionally determined. In item number 4, the "alarm" level is assumed to be stored in the DB2.

After that, assume that the result of fault state comparison made by the error management software 22b depicts that the fault state is different between the DB1 and DB2. The "normal" level of the fault state provisionally determined from the DB1 or the "alarm" level of the fault state acquired from the DB2, whichever is higher in the degree of seriousness, is set as the state of the hardware CPU #0. In the case under consideration, the "alarm" level is higher in seriousness, and therefore, the error management software 22b finishes the process without writing (restoring) the provisionally determined "normal" level of the fault state in the DB2. In other words, the "alarm" level of the fault state stored in the DB2 before rebooting is held as the contents of the DB2 indicating the fault state of the DB1.

(Item Number 5)

In item number 5, the service processor 20 is activated with the switching-on of the power of the information processing apparatus 10 as a motive, and the state prevails in which the cause of the fault stored in the DB1 is the "warning" indicating a partial fault. Under this condition, the error management software 22b acquires the cause of the fault from the bit area of the DB1 upon activation of the service processor 20. Then, the error management software 22b accesses the DB1, and in the case where the value "1" is set in the area of CPU #0 "CORE #1 TLB buffer error (bit 28)", provisionally judges that the fault state written (restored) in the DB2 is the "warning" level. Then, the error management software 22b acquires the fault state of CPU #0 from the DB2, and compares the fault state acquired from the DB2 with the provisionally determined fault state level. In item number 5, the "normal" level is assumed to be recorded in the DB2.

After that, assume that the result of fault state comparison made by the error management software 22b depicts that the fault state is different between the DB1 and DB2. The "warning" level of the fault state provisionally determined from the DB1 is higher in seriousness than the "normal" level of the fault state provisionally determined from the DB2. Therefore, by writing the "warning" level of the provisionally determined fault state in the DB2, the DB2 is restored and the process is finished. In other words, the "warning" level of the fault state restored based on the cause of the fault stored in the DB1 is held as the content of the DB2 indicating the fault state level stored in the DB1.

In the case of item number 5, the DB2 is entirely initialized to the value "0" by the activation of the service processor 20, and therefore, the error management software 22b cannot judge whether the mismatch is caused by the event loss or the initialization of the DB2. The error management software 22b gives preference to the mismatch due to the initialization of the DB2 over the mismatch due to the event loss. And, the error management software 22b gives preference to the mismatch, while at the same time making the judgment on the assumption that the event distribution software 22c and the reporting software 22e, which will be described later, are notified before activation of the service processor 20. As a result, the mismatch detection event is not notified to the event distribution software 22c.

(Item Number 6)

In item number 6, the service processor 20 is activated with the rebooting as a motive, and the state prevails in which the cause of the fault stored in the DB1 is the "warning" indicating a partial fault. Under this condition, the error management software 22b acquires the cause of the fault from the DB1 upon rebooting of the service processor 20. Then, in the case where the value "1" is set in the CPU #0 area "CORE #1 TLB buffer error (bit 28)" as the acquired cause of the fault, the error management software 22b provisionally judges that the fault state to be restored by writing in the DB2 is the "warning" level. After that, the error management software 22b acquires the fault state level of the CPU #0 from the DB2, and compares the level of the acquired fault state with that of the provisionally determined fault state. Here, in item number 6, the "normal" level is assumed to be stored in the DB2.

After that, assume that the result of fault state comparison made by the error management software 22b depicts that the fault state is different between the DB1 and DB2, and the "warning" level of the fault state provisionally determined from the DB1 is higher in seriousness than the "normal" level of the fault state provisionally determined from the DB2. Thus, the "warning" level of the provisionally determined fault state is written (restored) in the DB2. In other words, the "warning" level of the fault state restored based on the cause of the fault stored in the DB1 is held as the content of the DB2 indicating the fault state stored in the DB1.

In item number 6, the error management software 22b judges that the event may have been lost midway, and notifies the mismatch detection event to the event distribution software 22c described later. In other words, the error management software 22b judges that the event may have been lost due to the mismatch that occurred between the DB1 and DB2 in spite of the fact that the fault state stored in the DB2 by rebooting of the service processor 20 should be that before rebooting.

FIG. 11 is a diagram depicting an example of the information delivered to the event distribution software 22c by the error management software 22b according to the first embodiment, and FIG. 12 a diagram depicting the contents of the information delivered to the event distribution software 22c by the error management software 22b according to the first embodiment. The information delivered to the event distribution software 22c by the error management software 22b, as depicted in FIG. 11, is the binary data fixed at 128 bytes. This information includes the "occurrence time" indicating the time when the fault is detected by the hardware monitoring software 22a or the analysis program 22d. And, the "old state" indicating the state of the DB2 before rebooting the service processor 20, the "new state" indicating the state of the DB2 after mismatch detection, and the "detection source" indicating the component identifier for which the mismatch is detected. The information further includes the "faulty component name" indicating the character string designating the fault position and the "cause-of-fault character string" indicating the fixed character string designating the mismatch detection. In addition, each format and each fault component name have the contents as depicted in FIG. 12.

(Item Number 7)

In item number 7, the service processor 20 is activated with the rebooting as a motive, and the state prevails in which the cause of the fault stored in the DB1 is the "warning" indicating a partial fault. Under this condition, the error management software 22b acquires the cause of the fault from the bit area of the DB1 with the rebooting of the service processor 20. Then, in the case where the value "1" is set in the CPU #0 area "CORE #1 TLB buffer error (bit 28)" as the acquired cause of the fault, the error management software 22b provisionally judges that the fault state written (restored) in the DB2 is the "warning" level. After that, the error management software 22b acquires the level of the fault state of the CPU #0 from the DB2 and compares the level of the fault state acquired from the DB2 with that of the provisionally determined fault state. Incidentally, in item number 7, the "warning" level is assumed to be stored in the DB2.

After that, since the fault stare comparison result depicts that there is no difference in fault state between the DB1 and DB2, the error management software 22b finishes the process without writing (restoring) the provisionally determined fault state "warning" level in the DB2.

(Item Number 8)

In item number 8, the service processor 20 is activated with the rebooting as a motive, and the state prevails in which the cause of the fault stored in the DB1 is the "warning" indicating a partial fault. Under this condition, the error management software 22b acquires the cause of the fault from the bit area of the DB1 with the rebooting of the service processor 20. Then, in the case where the value "1" is set in the CPU #0 area "CORE #1 TLB buffer error (bit 28)" as the acquired cause of the fault, the error management software 22b provisionally judges that the fault state to be restored by writing in the DB2 is the "warning" level. After that, the error management software 22b acquires the level of the fault state of the CPU #0 from the DB2, and compares the level of the fault state acquired from the DB2 with that of the provisionally determined fault state. Incidentally, in item number 8, the "alarm" level is assumed to be stored in the DB2.

After that, the error management software 22b compares the fault state and determines that the fault state is different between the DB1 and DB2. Then, of the two fault states, i.e. the "warning" level provisionally judged from the DB1 and the "alarm" level acquired from the DB2, the latter, i.e. the "alarm" level of the fault state higher in the degree of seriousness is set as the state of the hardware CPU #0. In this way, the process is finished without writing (restoring) the provisionally determined fault state "warning" in the DB2. In other words, the "alarm" level of the fault state stored in the DB2 before rebooting is held as the content of the DB2 indicating the fault state of the DB1.

(Item Number 9)

In item number 9, the service processor 20 is activated with the switching-on of the power of the information processing apparatus 10 as a motive, and the state prevails in which the cause of the fault stored in the DB1 is the "alarm" indicating the total fault. Upon activation of the service processor 20 under this condition, the error management software 22b acquires the cause of the fault from the bit area of the DB1. Then, in the case where the value "1" is set in the area of CPU #0 "CORE #0 error (bit 31)" and "CORE #1 error (bit 30)" as the acquired cause of the fault, the error management software 22b judges that the entire CORE of the CPU #0 is faulty. And, the error management software 22b provisionally judges that the fault state written (restored) in the DB2 is the "alarm" level. Then, the error management software 22b acquires the "normal" level stored as the fault state of CPU #0 from the DB2, and compares the "normal" level of the fault state acquired from the DB2 with the "alarm" level of the provisionally determined fault state.

After that, assume that the result of fault state comparison made by the error management software 22b shows that the fault state is different between the DB1 and DB2. Moreover, the error management software 22b judges that the "alarm" level of the fault state provisionally determined from the DB1 is higher in the degree of seriousness than the "normal" level of the fault state provisionally determined from the DB2. Thus, the process is finished by writing and restoring the provisionally determined "alarm" level of the fault state in the DB2. In other words, the "alarm" level of the fault state restored based on the cause of the fault stored in the DB1 is held as the content of the DB2 indicating the fault state in the DB1.

Since the entire DB2 is initialized to the value "0" by the activation of the service processor 20, the error management software 22b cannot judge whether the mismatch is caused by the event loss or the initialization of the DB2. The error management software 22b gives preference to the mismatch due to the initialization of the DB2 over the mismatch due to the event loss. And, while at the same time, the initialization of the DB2 makes the judgment on the assumption that the event distribution software 22c and the reporting software 22e described later are notified before the activation of the service processor 20, with the result that the mismatch detection event is not notified to the event distribution software 22c.

(Item Number 10)

In item number 10, the service processor 20 is activated with the rebooting as a motive, and the state prevails in which the cause of the fault stored in the DB1 is the "alarm" indicating the total fault. Upon the rebooting of the service processor 20 under this condition, the error management software 22b acquires the cause of the fault from the bit area of the DB1. Then, the error management software 22b judges that the entire CORE of the CPU #0 is faulty in the case where the value "1" is set in the area of CPU #0 "CORE #0 error (bit 31)" and "CORE #1 error (bit 30)" as the acquired cause of the fault. Moreover, the error management software 22b provisionally judges that the fault state written (restored) in the DB2 is the "alarm" level. Then, the error management software 22b acquires the "normal" level stored in the DB2 as the fault state of CPU #0, and compares the "normal" level of the fault state acquired from the DB2 with the "alarm" level of the provisionally determined fault state.

After that, assume that the result of fault state comparison made by the error management software 22b depicts that the fault state is different between the DB1 and DB2. Moreover, the error management software 22b judges that the "alarm" level of the fault state provisionally determined from the DB1 is higher in the degree of seriousness than the "normal level" of the fault state provisionally determined from the DB2. Thus, the provisionally determined "alarm" level of the fault state is written (restored) in the DB2. In other words, the "alarm" level of the fault state restored based on the cause of the fault stored in the DB1 is held as the content of the DB2 indicating the fault state stored in the DB1.

The error management software 22b judges that the event may have been lost midway and notifies the mismatch detection event to the event distribution software 22c that is described later. Specifically, the error management software 22b judges this due to the rebooting of the service processor 20. Therefore, the event may have been lost midway because of the occurrence of mismatch between the DB1 and DB2 in spite of the fact that the fault state of the DB2 should be the same as the one before rebooting of the service processor 20.

The information delivered by the error management software 22b to the event distribution software 22c, as depicted in FIG. 11, is the binary data fixed at 128 bytes. This information includes the "occurrence time" indicating the time when the fault is detected by the hardware monitoring software 22a or the analysis program 22d, the "old state" indicating the state of the DB2 before rebooting the service processor 20 and the "new state" indicating the state of the DB2 after mismatch detection. This information also includes the "detection source" indicating the component identifier for which the mismatch is detected, the "faulty component name" indicating the character string designating the fault position and the "cause-of-fault character string" indicating the fixed character string designating the mismatch detection. Also, each format and each fault component name have the contents as depicted in FIG. 12.

(Item Number 11)

In item number 11, the service processor 20 is activated with the rebooting as a motive, and the state prevails in which the cause of the fault stored in the DB1 is the "alarm" indicating the total fault. Upon the rebooting of the service processor 20 under this condition, the error management software 22b acquires the cause of the fault from the bit area of the DB1. Then, the error management software 22b judges that the entire CORE of the CPU #0 is faulty in the case where the value "1" is set in the area of CPU #0 "CORE #0 error (bit 31)" and "CORE #1 error (bit 30)" as the acquired cause of the fault. Moreover, the error management software 22b provisionally judges that the fault state to be restored by writing in the DB2 is the "alarm" level. Then, the error management software 22b acquires the "warning" level stored in the DB2 as the fault state of CPU #0. In addition, the error management software 22b compares the "warning" level of the fault state acquired from the DB2 with the "alarm" level of the provisionally determined fault state.

After that, assume that the result of the fault state comparison made by the error management software 22b depicts that the fault state is different between the DB1 and DB2. Moreover, the fault state comparison made by the error management software 22b depicts the "alarm" level of the fault state provisionally determined from the DB1 is higher in the degree of seriousness than the "warning" level of the fault state provisionally determined from the DB2. The "alarm" level of the provisionally determined fault state is restored by writing in the DB2. In other words, the "alarm" level of the fault state restored based on the cause of the fault stored in the DB1 is held as the content of the DB2 indicating the fault state level stored in the DB1.

The error management software 22b judges that the event may have been lost midway, and notifies the mismatch detection event to the event distribution software 22c described later. In other words, the error management software 22b judges that due to the rebooting of the service processor 20, the event may have been lost midway by the mismatch between the DB1 and DB2 in spite of the fact that the fault state stored in the DB2 should be the same as before rebooting of the service processor 20.

The information delivered to the event distribution software 22c by the error management software 22b, as depicted in FIG. 11, is the binary data fixed at 128 bytes. This information includes the "occurrence time" indicting the time when the fault is detected by the hardware monitoring software 22a or the analysis program 22d, the "old state" indicating the state of the DB2 before rebooting the service processor 20 and the "new state" indicating the state of the DB2 after mismatch detection. This information also includes the "detection source" indicating the component identifier for which the mismatch is detected, the "faulty component name" indicating the character string designating the fault position and the "cause-of-fault character string" indicating the fixed character string designating the mismatch detection. Each format and each faulty component name have the contents as depicted in FIG. 12.

(Item Number 12)

In item number 12, the service processor 20 is activated with the rebooting as a motive, and the state prevails in which the cause of the fault stored in the DB1 is the "alarm" indicating the total fault. Upon the rebooting of the service processor 20 under this condition, the error management software 22b acquires the cause of the fault from the bit area of the DB1. Then, the error management software 22b judges that the entire CORE of the CPU #0 is faulty in the case where the value "1" is set in the area of CPU #0 "CORE #0 error (bit 31)" and "CORE #1 error (bit 30)" as the acquired cause of the fault. Moreover, the error management software 22b provisionally judges that the "alarm" level of the fault state is written (restored) in the DB2. Then, the error management software 22b acquires the "alarm" level stored in the DB2 as the fault state of CPU #0, and compares the "alarm" level of the fault state acquired from the DB2 with the "alarm" level of the provisionally determined fault state.

After that, assume that the result of fault state comparison made by the error management software 22b depicts that the fault state is not different between the DB1 and DB2. The process is thus finished by writing (restoring) the "alarm" level of the provisionally determined fault state in the DB2.

Next, the function of the event distribution software 22c is explained. The event distribution software 22c holds in a queue the mismatch detection event notified from the error management software 22b. As a specific example, the mismatch detection event detected as mismatching and notified by the event distribution software 22c are stored as a queue in a predetermined area by the event distribution software 22c.

The analysis program 22d receives the error notification from the hardware resource 11. As a specific example, the analysis program 22d is started while at the same time being transferred to the state ready to receive the error notification from the hardware resource 11 when the mismatch detection events are set in a queue by the event distribution software 22c.

The reporting software 22e, upon receipt of the mismatch detection event notified from the error management software 22b, notifies the management server 1. As a specific example, the reporting software 22e receives the mismatch detection events set in a queue by the event distribution software 22c and notified by the error management software 22b. Then, the reporting software 22e generates the character string in the reporting format from the mismatch detection events received, and notifies the fault information to the management server 1 using the electronic mail or the SNMP (simple network management protocol).

The information received from the error management software 22b by the reporting software 22e, as depicted in FIG. 13, is the binary data fixed to 128 bytes. This information includes the "occurrence time" indicating the time when the fault is detected by the hardware monitoring software 22a or the analysis program 22d, the "old state" indicating the state of the DB2 before rebooting the service processor 20 and the "new state" indicating the state of the DB2 after mismatch detection. This information also includes the "detection source" indicating the component identifier for which the mismatch is detected, the "faulty component name" indicating the character string designating the fault position and the "cause-of-fault character string" indicating the fixed character string designating the mismatch detection. Also, each format and each faulty component name have the contents as depicted in FIG. 14. Incidentally, FIG. 13 is a diagram depicting an example of the information received by the reporting software 22e from the error management software 22b, and FIG. 14 is a diagram depicting the contents of the information received by the reporting software 22e according to the first embodiment from the error management software 22b.

The character string of the reporting format generated by the reporting software 22e is depicted in FIGS. 15 and 16. The character string is configured of the occurrence time "2007/Dec/31 23:59:30" indicating the time point when the fault is detected, the hardware resource "CPU #0" indicating the hardware resource 11 of which the fault is detected, the cause-of-fault character string "component status mismatched" indicating a fixed character string designating the mismatch event detection and the "warning-to-alarm" level indicating the state of the DB2 before rebooting of the service processor 20 and after mismatch event detection. Incidentally, FIG. 15 is a diagram depicting an example of the character string of the reporting format generated by the reporting software 22e according to the first embodiment, and FIG. 16 a diagram depicting the contents of the character string of the reporting format generated by the reporting software 22e according to the first embodiment.

Figure 17:
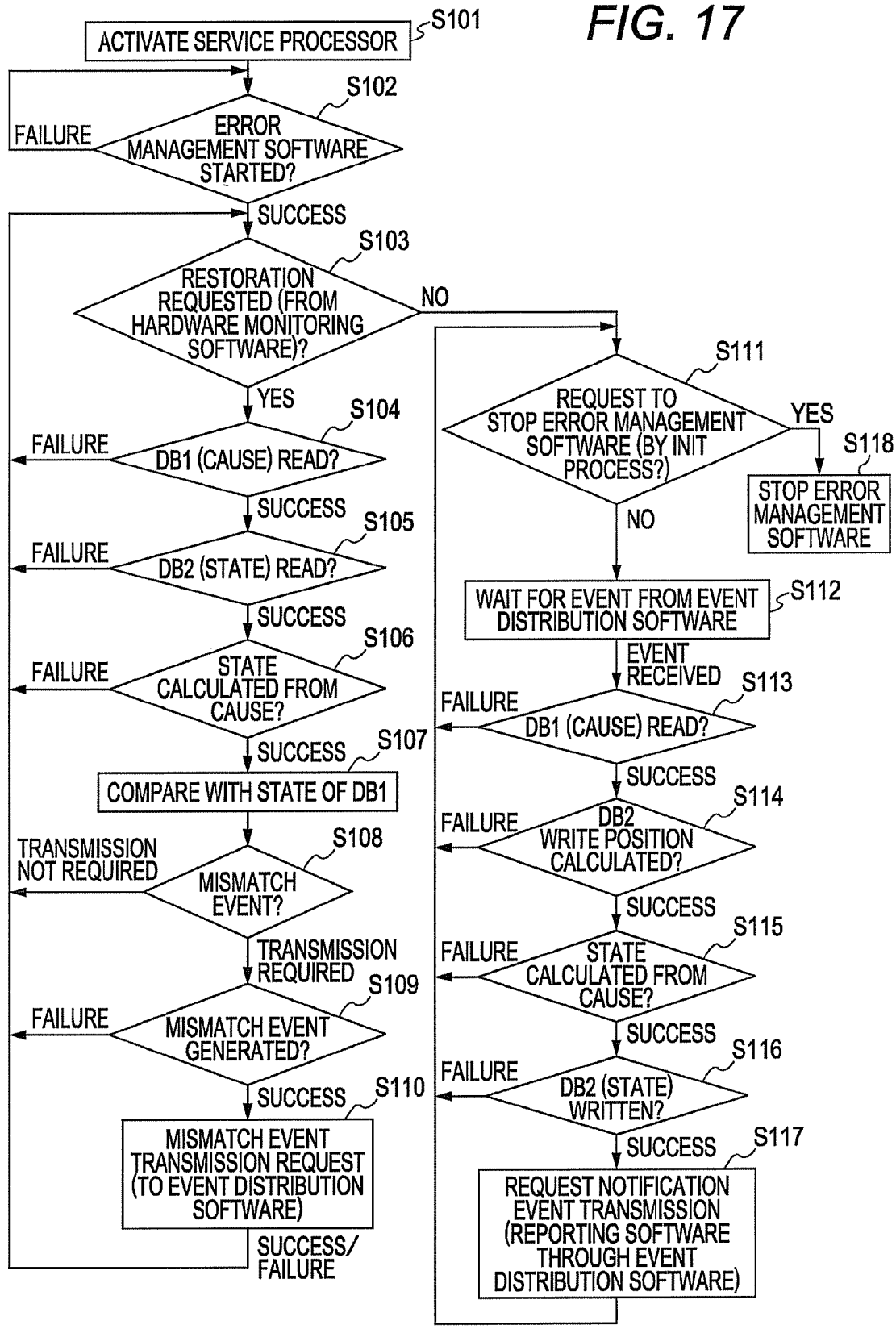
FIG. 17 is a flowchart explaining the fault information notification process executed by the information processing apparatus according to the first embodiment.

Next, the fault information notification process executed by the information processing apparatus 10 according to the first embodiment is explained with reference to FIG. 17. FIG. 17 is a flowchart for explaining the fault information notification process executed by the information processing apparatus 10 according to the first embodiment.

As depicted in FIG. 17, upon activation of the service processor (step S101), the information processing apparatus 10 activates the error management software 22b ("success" in step S102) to judge whether a restoration request is received from the hardware monitoring software 22a or not (step S103). In the case where a restoration request is received from the hardware monitoring software 22a (YES in step S103), the information processing apparatus 10 reads the cause of the fault held in the DB1 and further reads the fault state held in the DB2 ("success" in step S104 and "success" in step S105).

Next, based on the cause of the fault read from the DB1, the information processing apparatus 10 provisionally determines the fault state of the DB2 to be restored ("success" in step S106), and compares the provisionally determined fault state with the fault state recorded in the DB1 (step S107). After that, upon detection of the mismatch between the fault state recorded in the DB1 and the provisionally determined fault information in the DB2 ("transmission required" in step S108), the information processing apparatus 10 generates the mismatch event based on the mismatch ("success" in step S109). Moreover, the information processing apparatus 10 sends to the event distribution software 22c a request to transmit the mismatch event (step S110).

In the absence of a restoration request from the hardware monitoring software 22a (NO in step S103), on the other hand, the information processing apparatus 10 judges whether a request has come to stop the error management software 22b due to the init process or the like (step S111). In the absence of a request to stop the error management software 22b due to the init process (NO in step S111), the information processing apparatus 10 receives the mismatch event from the event distribution software 22c (step S112).

After that, the information processing apparatus 10 reads the cause of the fault held in the DB1 ("success" in step S113), calculates the position of the DB2 to be restored ("success" in step S114), and based on the cause of the fault held in the DB1, calculates the fault state held in the DB2 ("success" in step S115). Then, the information processing apparatus 10 restores the DB2 by writing the calculated fault state in the DB2 ("success" in step S116), and sends to the reporting software 22e a request to transmit the fault information notification event (step S117).

Next, upon receipt of the request to stop the error management software 22b due to the init process or the like (YES in step S111), the information processing apparatus 10 stops the error management software 22b (step S118). Incidentally, the reporting software 22e, having received the request to transmit the fault information notification event, sends the fault information to the management server 1 connected.

As described above, according to the first embodiment, the information processing apparatus can restore the fault information in the volatile storage unit even in the case where the power supply is shut down. Specifically, the information processing apparatus, upon activation of the service processor, can restore the fault state based on the cause of the fault of the hardware resource held therein, with the result that the fault state can be restored with few resources without the area for preventing the fault state. In addition, since the information processing apparatus can restore the fault state, the management server or the like connected can be notified without losing the fault state.

Upon activation of the service processor, for example, the information processing apparatus restores the fault state held in the DB2 based on the cause of the fault held in the DB1 while at the same time checking the matching between the DB1 and DB2. Then, the information processing apparatus, upon detection of a mismatch, notifies the mismatch detection event to the connected management server or the like. As a result, the information processing apparatus having both the non-volatile and volatile storage units can restore the fault information in the volatile storage unit.

Second Embodiment

In addition to the embodiment described above, the information processing apparatus disclosed may be implemented in various different forms. In view of this, different embodiments are explained with respect to (1) the configuration of the information processing apparatus and (2) the program thereof.

(1) Configuration of Information Processing Apparatus

The processing steps, the control steps, the specific names and the information including the various data and parameters depicted in the document and the diagrams (for example, the items and numerical values stored in the DB1 and the DB2 depicted in FIG. 2) can be changed arbitrarily unless otherwise specified. Further, the present invention is not limited to the first embodiment describing the information processing apparatus for restoring the fault information and conducting the matching test of the fault information, but may alternatively be implemented as an information processing apparatus for one of the processes of restoring the fault information and conducting the matching test of the fault information.

Further, the function of each component of each device illustrated above may be interpreted as conceptual but not necessarily physically configured as depicted. Specifically, a specific form of distribution or integration of the devices is not limited to the depicted examples. The error management software 22b and the reporting software 22e, for example, may be integrated as an error management/reporting software adapted not only to restore the fault information and conduct the matching test but also to notify the occurrence of a fault upon detection of a mismatch. In other words, the whole or a part of the components of the apparatus can be distributed or integrated functionally or physically in arbitrary units in accordance with the various loads or applications. Further, each processing function executed by each device can be wholly or partially implemented by a CPU or a program analyzed and executed by the CPU or realized as a hardware based on a wired logic.

(2) Program

Figure 18:
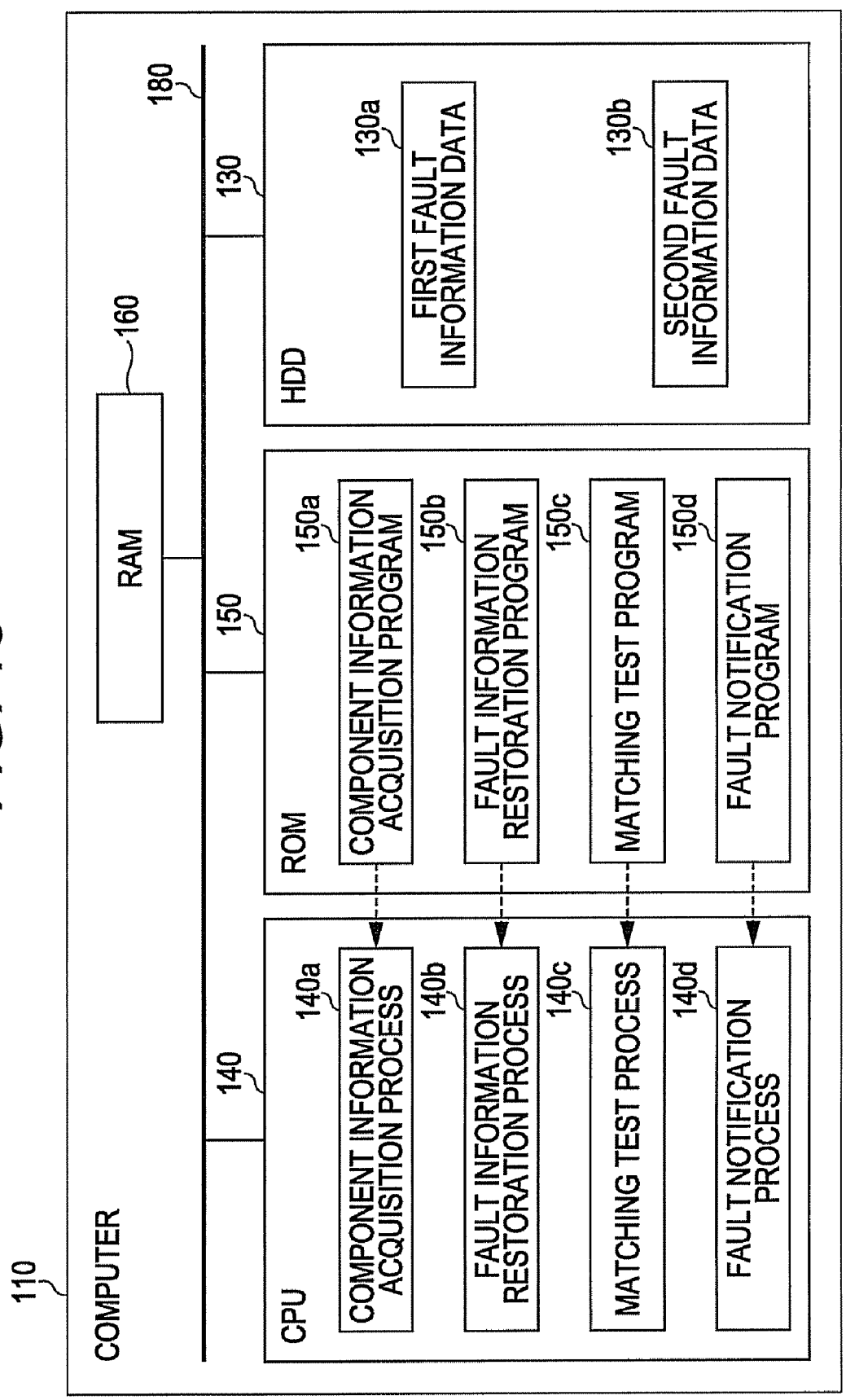
FIG. 18 is a diagram depicting the computer executing the control program.
Figure 19:
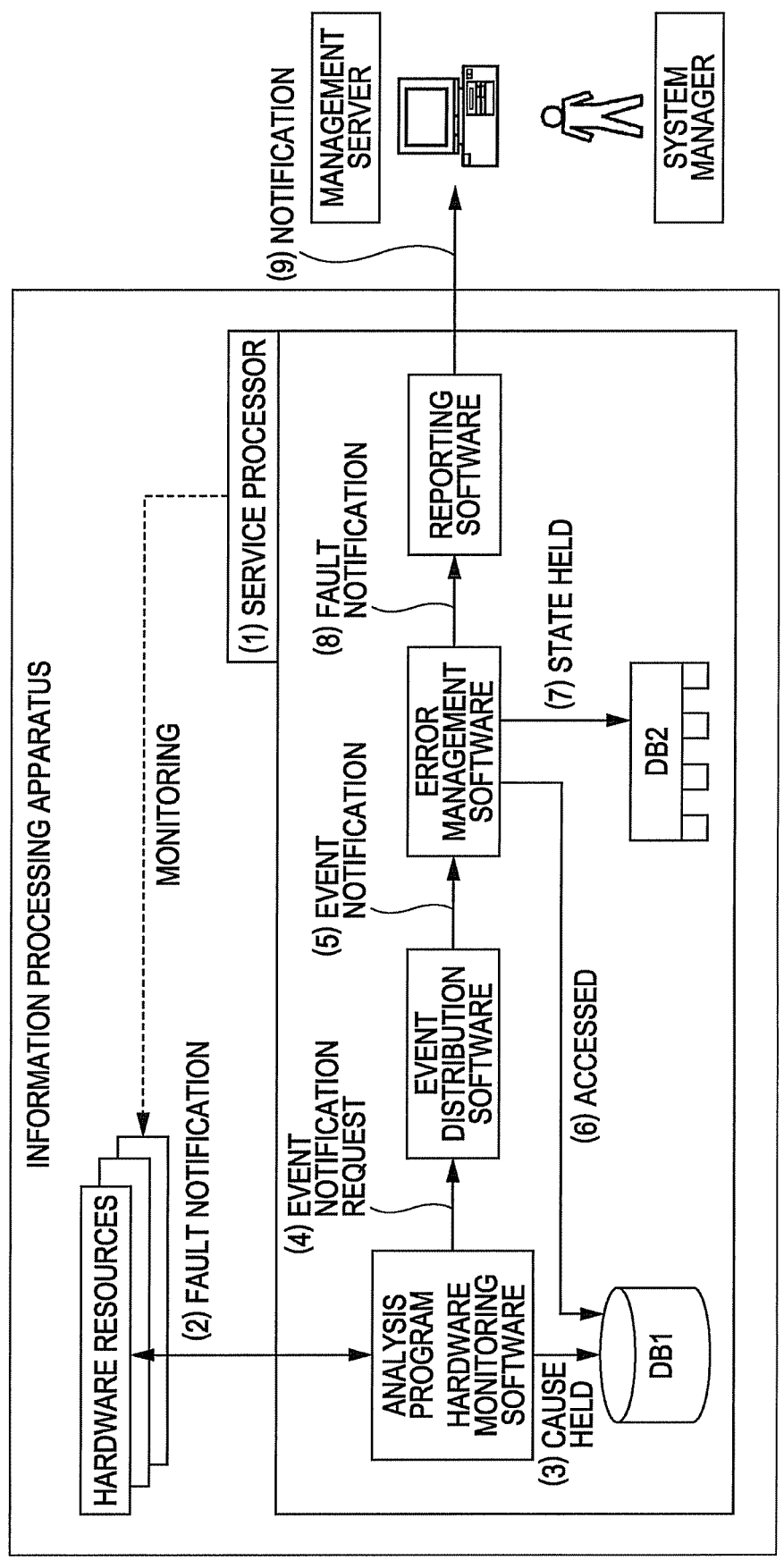
FIG. 19 is a diagram for explaining the fault information notification process executed by the conventional information processing apparatus.

A case in which the various processes are executed by the hardware logic has been described in the embodiments described above. This invention, however, is not limited to the case, and may be implemented by causing a computer to execute a program prepared in advance. In view of this, an example of the computer for executing the control program having a similar function to the information processing apparatus depicted in the embodiments above is explained with reference to FIG. 18. FIG. 18 is a diagram depicting the computer for executing the control program.

As depicted in FIG. 18, the computer 110 constituting an information processing apparatus is configured of a HDD 130, a CPU 140, a ROM 150 and a RAM 160 connected through a bus 180 or the like.

The ROM 150 stores therein the control programs exhibiting similar functions to the information processing apparatus 10 according to the first embodiment described above.

Specifically, as depicted in FIG. 18, the component information acquisition program 150a, the fault information restoration program 150b, the matching test program 150c and the fault notification program 150d are stored beforehand in the ROM 150. Incidentally, these programs 150a to 150d, like the components of the information processing apparatus 10 depicted in FIG. 2, may be distributed or integrated appropriately.

The CPU 140 executes programs 150a to 150d by reading these programs 150a to 150d from the ROM 150. Specifically, as depicted in FIG. 18, the programs 150a to 150d function as a component information acquisition process 140a, a fault information restoration process 140b, a matching test process 140c and a fault notification process 140d. Incidentally, the processes 140a to 140d correspond to the hardware monitoring software 22a, the error management software 22b and the reporting software 22e, respectively, depicted in FIG. 2.

The CPU 140 executes the control programs based on the first fault information data 130a and the second fault information data 130b recorded in the HDD 130.

Incidentally, the programs 150a to 150d are not necessarily stored in the ROM 150 from the very beginning. These programs may alternatively be stored in a "portable physical medium" such as a computer-readable flexible disk (FD), a CD-ROM, a DVD, a magnetooptic disk or an IC card inserted into the computer 110. As an alternative, these programs may be stored in a "fixed physical medium" such as a HDD arranged in or outside the computer 110. Further, each program may be stored in "any other computers or servers" connected to the computer 110 through the public telephone line, the internet, LAN or WAN so as to be read and executed by the computer 110.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An information processing apparatus that includes a plurality of hardware resources and operates on a power supplied from a first power supply, comprising:
    a non-volatile first storage unit configured to hold first fault information on a fault developed in a hardware resource;
    a volatile second storage unit configured to hold second fault information on a fault developed in any of the hardware resources that is different from the first fault information;
    a hardware monitoring unit configured to acquire component information of the hardware resources included in the information processing apparatus; and
    a system control unit configured to restore the second fault information into the second storage unit based on the acquired component information and the first fault information stored in the first storage unit.

2. The information processing apparatus according to claim 1, further comprising:
    a second power source configured to supply power to the system control unit;
    wherein the second power supply continues to supply power to the system control unit even when the first power supply is shut down.

3. The information processing apparatus according to claim 1,
    wherein the second fault information is restored when the first power supply is turned on.

4. The information processing apparatus according to claim 1,
    wherein the first fault information includes identification information identifying a hardware resource that has developed a fault and information indicating a cause of the fault in the hardware resource that has developed the fault.

5. The information processing apparatus according to claim 1,
    wherein the second fault information includes identification information identifying a hardware resource that has developed a fault and information indicating a degree of the fault in the hardware resource that has developed the fault.

6. An information processing apparatus that includes a plurality of hardware resources and operates on a power supplied from a first power supply, comprising:
    a first storage unit configured to hold first fault information on a fault developed in a hardware resource, wherein the first storage unit keeps holding the first fault information even when the first power supply is shut down;
    a second storage unit configured to hold second fault information that is different from the first fault information and adapted not to hold the second fault information when the first power supply is shut down;
    a fault information management unit configured to decide a matching between the first fault information and the second fault information; and
    a system control unit configured to make a fault reporting unit notify a fault occurrence when a mismatch is detected between the first fault information and the second fault information.

7. The information processing apparatus according to claim 6, further comprising a second power supply for supplying power to the system control unit,
    wherein the second power supply continues to supply power to the system control unit even when the first power supply is shut down.

8. The information processing apparatus according to claim 6,
    wherein the fault information management unit restores the second fault information based on component information of the hardware resources included in the information processing unit acquired and the first fault information stored in the first storage unit when the first power supply is turned on.

9. The information processing apparatus according to claim 6,
    wherein the first fault information includes identification information identifying a hardware resource having developed a fault and a cause of the fault in the hardware resource that has developed the fault.

10. The information processing apparatus according to claim 6,
    wherein the second fault information includes identification information identifying a hardware resource that has developed a fault and information indicating a degree of the fault in the hardware resource that has developed the fault.

11. A control method for an information processing apparatus including a plurality of hardware resources and a system control unit controlling the plurality of the hardware resources, comprising:

holding first fault information on a fault developed in a hardware resource in a non-volatile first storage unit;

holding second fault information different from the first fault information in a volatile second storage unit;

acquiring component information of the plurality of the hardware resources included in the information processing apparatus when a first power supply is switched on; and restoring the second fault information into the second storage unit based on the acquired component information and the first fault information stored in the first storage unit.

12. A control method for an information processing apparatus that includes a plurality of hardware resources and a system control unit controlling the plurality of hardware resources and that operates on a first power supply, comprising:

holding first fault information on fault developed in a hardware resource in a non-volatile first storage unit;

holding second fault information different from the first fault information in a volatile second storage unit; and notifying an occurrence of a fault when a mismatch is detected between the first fault information and the second fault information, when the first power supply is switched on.

13. A computer-readable recording medium storing a control program for an information processing apparatus including a plurality of hardware resources and a system control unit controlling the plurality of the hardware resources and operating on a first power supply, the program when executed by a computer causes the computer to perform a method comprising:

holding first fault information on a fault developed in a hardware resource in a non-volatile first storage unit;

holding second fault information different from the second fault information in a second volatile storage unit;

acquiring component information of the plurality of the hardware resources included in the information processing apparatus when the first power supply is switched on; and restoring the second fault information into the second storage unit based on the component information and the first fault information stored in the first storage unit.

14. A computer-readable recording medium storing a control program for an information processing apparatus including a plurality of hardware resources and a system control unit controlling the plurality of the hardware resources and operating on a first power supply, the program when executed by a computer causes the computer to perform a method comprising:

holding first fault information on a fault developed in a hardware resource in a non-volatile first storage unit;

holding second fault information different from the first fault information in a volatile second storage unit; and notifying an occurrence of a fault when a mismatch is detected between the first fault information and the second fault information, when the first power supply is switched on.

* * * * *